United States Patent
Chou et al.

(10) Patent No.: US 10,455,804 B2
(45) Date of Patent: Oct. 29, 2019

(54) TOILET FOR CAT

(71) Applicants: Shih-Chieh Chou, New Taipei (TW); Lu-Ting Hsu, New Taipei (TW)

(72) Inventors: Shih-Chieh Chou, New Taipei (TW); Lu-Ting Hsu, New Taipei (TW)

( * ) Notice: Subject to any disclaimer, the term of this patent is extended or adjusted under 35 U.S.C. 154(b) by 168 days.

(21) Appl. No.: 15/373,487

(22) Filed: Dec. 9, 2016

(65) Prior Publication Data

US 2017/0273273 A1 Sep. 28, 2017

(30) Foreign Application Priority Data

Mar. 28, 2016 (TW) .............................. 105109688 A

(51) Int. Cl.
*A01K 1/01* (2006.01)

(52) U.S. Cl.
CPC .................................. *A01K 1/0107* (2013.01)

(58) Field of Classification Search
CPC ........ A01K 1/01; A01K 1/011; A01K 1/0114; A01K 1/0103; A01K 1/0107
USPC ....... 119/161, 162, 163, 164, 165, 166, 167, 119/168, 169, 170
See application file for complete search history.

(56) References Cited

U.S. PATENT DOCUMENTS

| | | | | |
|---|---|---|---|---|
| 1,813,329 A * | 7/1931 | Supplee | ................. | A01K 1/011 119/161 |
| 3,107,650 A * | 10/1963 | Cass | .................... | A01K 1/0107 119/417 |
| 4,785,765 A * | 11/1988 | Campbell | .............. | A01K 1/031 119/417 |
| 5,184,574 A * | 2/1993 | Kirk | ....................... | A01K 1/011 119/162 |
| 6,138,609 A | 10/2000 | Gordon | | |
| 6,453,844 B1 | 9/2002 | Janzen et al. | | |
| 7,107,933 B2 | 9/2006 | Mohr | | |
| 7,114,464 B1 * | 10/2006 | Chang | .................... | A01K 1/011 119/479 |
| 2007/0039877 A1* | 2/2007 | Van Slyke | ............... | A01K 1/01 210/513 |
| 2011/0315084 A1* | 12/2011 | Miller | .................... | A01K 1/011 119/166 |
| 2012/0124731 A1* | 5/2012 | Trott | ...................... | A47K 11/02 4/476 |

(Continued)

FOREIGN PATENT DOCUMENTS

| | | |
|---|---|---|
| CN | 202603346 U | 12/2012 |
| CN | 203700138 | 7/2014 |
| TW | M385928 U1 | 8/2010 |

*Primary Examiner* — Tien Q Dinh
*Assistant Examiner* — Ebony E Evans

(57) ABSTRACT

A toilet for separating excreta of a cat into feces and urine includes a supporting part, a feces storage container, an inclined classifying part, and a urine storage container. The supporting part has a supporting surface and an egestion opening formed on the supporting surface. The feces storage container is disposed below the supporting surface, and has a first entrance. The inclined classifying part has a sloped surface and through holes formed on the sloped surface. The egestion opening allows the sloped surface to be exposed for guiding the feces, so as to move the feces along the sloped surface to the first entrance, and allow the feces to enter the feces storage container from the first entrance. The urine storage container is disposed below the sloped surface for receiving urine flowed from the through holes.

19 Claims, 14 Drawing Sheets

(56) References Cited

U.S. PATENT DOCUMENTS

2013/0167777 A1* 7/2013 Sweetman ........... A01K 1/0107
  119/165
2013/0298324 A1* 11/2013 Dreher ................... A47K 11/02
  4/479
2014/0033990 A1* 2/2014 Brown ................ A01K 1/0107
  119/719
2016/0295828 A1* 10/2016 Fenwick .............. A01K 1/0107

* cited by examiner

US 10,455,804 B2

TOILET FOR CAT

FIELD OF THE INVENTION

The invention relates to a device for disposing animal's excreta, and more particularly to a device for allowing cat's defecation and urination.

BACKGROUND OF THE INVENTION

Cats are now many people's favorite pets. Although the cat looks lovely, the cat's excreta always stinks. When the cat defecates and urinates in an improper place, such as a sofa or a carpet, it will become difficult to dispose of excreta. There is a device for allowing cat's defecation and urination (litter box), and cat litter for burying excreta is filled therein, besides, the litter box used by the cat will be mixed with excreta including urine and feces. It is necessary to clean the litter box frequently, for preventing affecting the environmental hygiene. In addition, since the cat litter's consumption is great, it will considerably cost a lot in a prolonged period.

SUMMARY OF THE INVENTION

The present invention provides a toilet for separating excreta of a cat into feces and urine.

A toilet of the present invention for separating excreta of a cat into feces and urine is provided. The toilet for cat includes a supporting part, a feces storage container, an inclined classifying part and a urine storage container. The supporting part includes a supporting surface and an egestion opening formed on the supporting surface. The feces storage container is disposed below the supporting surface, and has a first entrance. The inclined classifying part has a sloped surface and a through hole formed on the sloped surface. The sloped surface is exposed through the egestion opening for guiding the feces, so that the feces moves along sloped surface to the first entrance and enter the feces storage container through the first entrance. The urine storage container is disposed below the sloped surface for storing the urine flowed from the through hole.

The through hole of the inclined classifying part can guide urine into the urine storage container, and the sloped surface of the inclined classifying part can transfer the feces to the feces storage container. Thus, feces and urine are separately stored to keep feces dry.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

Figure 1A:
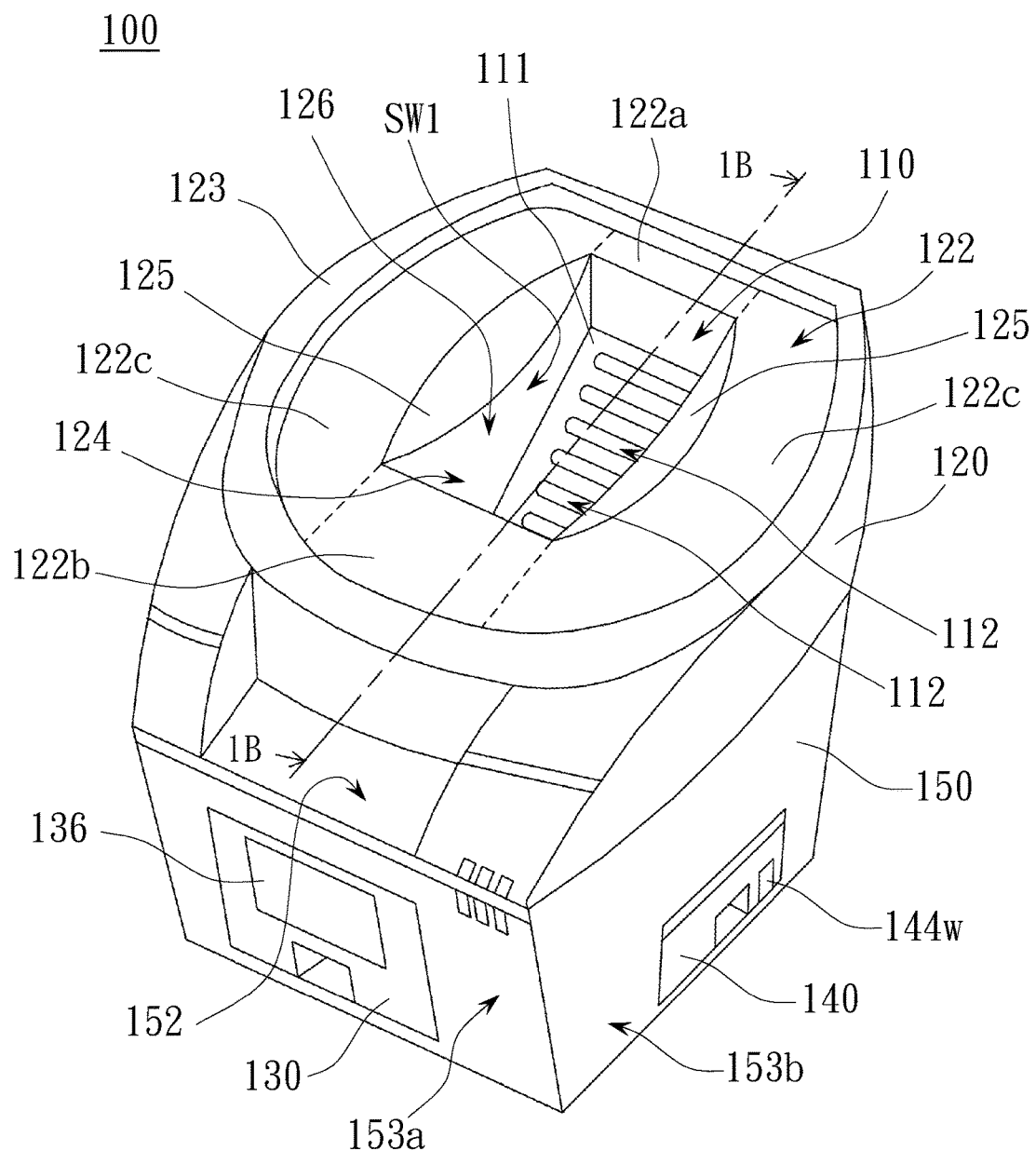
FIG. 1A is a three-dimensional schematic illustration of a toilet for cat according to an embodiment of the invention.

FIG. 1A is a three-dimensional schematic illustration of a toilet for cat according to an embodiment of the invention. Please refer to FIG. 1A, a toilet for cat 100 is suitable to cat's defecation and urination, and comprises an inclined classifying part 110 and a supporting part 120. The inclined classifying part 110 is located in the supporting part 120, and can be surrounded by the supporting part 120. The supporting part 120 is formed with a supporting surface 122 and an egestion opening 124, and the egestion opening 124 is formed within the supporting surface 122 and allow the inclined classifying part 110 to be exposed. In addition, the supporting part 120 further comprises a fence 123, and the fence 123 is formed around the supporting surface 122 and extrudes from the supporting surface 122.

Figure 1B:
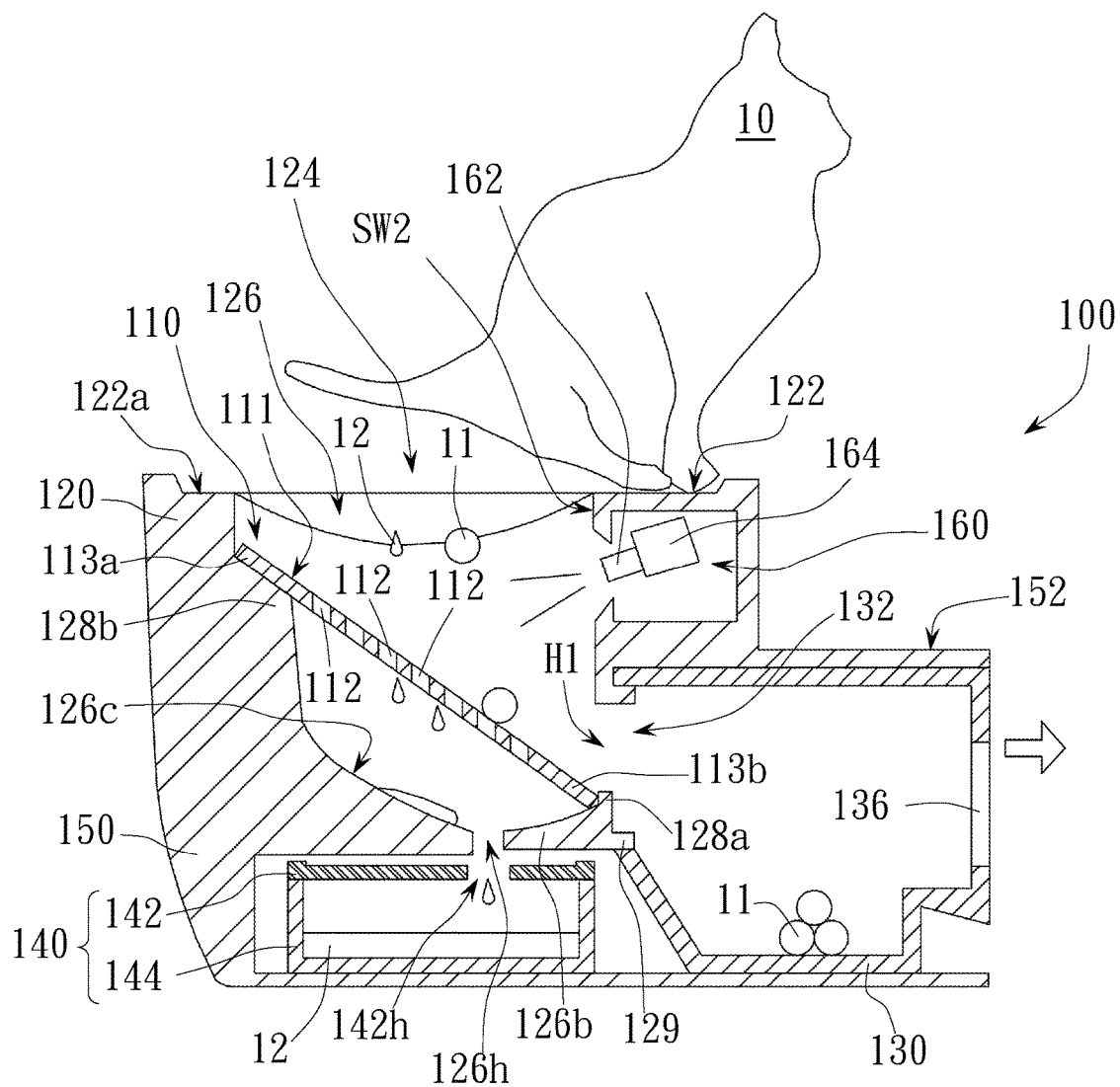
FIG. 1B is a cross-sectional schematic illustration of a cross-section along line 1B-1B as illustrated in FIG. 1A.

FIG. 1B is a cross-sectional schematic illustration of a cross-section along line 1B-1B as illustrated in FIG. 1A. Please refer to FIG. 1A and FIG. 1B, the inclined classifying part 110 is capable of separating the excreta into feces 11 and urine 12, and formed with an sloped surface 111 and a plurality of through holes 112. Such through holes 112 are formed on the sloped surface 111, and the egestion opening 124 allows the sloped surface 111 and at least one of the through holes 112 to be exposed. Taking FIG. 1A and FIG. 1B as an example, the egestion opening 124 allows at least two of the through holes 112 to be exposed.

The supporting part 120 is capable of supporting the cat 10, so that the cat 10 can walk, sit or lie on the supporting surface 122, wherein the supporting surface 122 can be planar. The inclined classifying part 110 can be a plate in shape, and formed with an upper end 113a and a lower end 113b opposite to the upper end 113a. The supporting surface 122 is formed with a first area 122a, a second area 122b and a pair of lateral side areas 122c. When viewing from FIG. 1A, the supporting surface 122 can be a ring in shape, and the egestion opening 124 is surrounded by the first area 122a, the second area 122b and the pair of lateral side areas 122c.

The first area 122a is connected between the pair of lateral side areas 122c, and the second area 122b is opposite to the first area 122a. The upper end 113a is placed between the first area 122a and the lower end 113b, and the lower end 113b is placed between the second area 122b and the upper end 113a. The first area 122a is smaller than the second area 122b in area, and the first area 122a can be smaller than one or two thenars of the cat 10 in area, so that the cat 10 would not be able to stamp the first area 122a. In addition, in other embodiments, it is unnecessary for the supporting surface 122 to have the first area 122a, i.e. the supporting surface 122 may be in a U shape. Therefore, the supporting surface 122 may not be in a ring shape.

The toilet for cat 100 further comprises a feces storage container 130 and a urine storage container 140, and both of the feces storage container 130 and the urine storage container 140 are arranged below the supporting surface 122. The urine storage container 140 is arranged below the sloped surface 111. In this embodiment, the urine storage container 140 is directly located below the inclined classifying part 110. The feces storage container 130 and the urine storage container 140 are used for storing the feces 11 and the urine 12, respectively.

The feces storage container 130 is formed with a first entrance 132 suitable for inletting of the feces 11, and the urine storage container 140 is formed with a second entrance 142h suitable for inletting of the urine 12, wherein the lower end 113b is adjacent to the first entrance 132. When the cat 10 uses the toilet for cat 100 for defecation and urination, it is suitable for the cat 10 to climb the supporting surface 122, and directly discharge excreta into the egestion opening 124, so that the excreta will drop from the egestion opening 124 onto the sloped surface 111. Therefore, even without cat litter, it is still possible for the cat 10 to use the toilet for cat 100 for defecation and urination.

However, some cats may refuse to go to the toilet for cat 100 for defecation and urination when contacting the toilet for cat 100 at first, since there is no cat litter therein, therefore, the cat's owner can firstly put a container filled with cat litter on the egestion opening 124, for training the cat to go to the egestion opening 124 for defecation and urination. Thereafter, by gradually reducing the cat litter, the cat's dependence on cat litter can be reduced. Eventually, even removing the cat litter completely, it would be possible for the cat to use the toilet for cat 100 for defecation and urination, without the cat litter. In addition, the fence 123, which is provided around the supporting surface 122, can confine the cat litter to the supporting surface 122, so that the cat litter dropped from the supporting surface 122 can be reduced, free of the mess caused by the cat litter.

The cat 10 unusually discharges the feces 11 and the urine 12 at the same time, therefore, the discharged excreta of cat 10 is usually the feces 11 or the urine 12. When the discharged feces 11 of the cat 10 drop on the sloped surface 111, the sloped surface 111 would guide the feces 11 into the feces storage container 130. Generally, the discharged feces 11 of the cat 10 are usually block in shape, with quite low viscosity, therefore, the feces 11 on the sloped surface 111 would move along the sloped surface 111 into the first entrance 132 due to gravity, and enter the feces storage container 130 through the first entrance 132. Thus, the sloped surface 111 can guide the feces 11 to the feces storage container 130 through the first entrance 132.

When the discharged urine 12 of the cat 10 drops on the sloped surface 111, the urine 12 will flow into one or a plurality of the through holes 112 along the sloped surface 111, and flow out via the through holes 112, eventually, the urine 12 from the through holes 112 would be stored in the urine storage container 140. Thus, the toilet for cat 100 is not only suitable for defecation and urination of the cat 10, but also suitable for storing the feces 11 and the urine 12 separately, free of mixture of the feces 11 and the urine 12, and able to keep the feces 11 dry. It thus becomes convenient to clean the feces 11 and the urine 12, and reduces frequencies of cleaning the feces 11 and the urine 12.

The supporting part 120 further includes a guide concavity 126, which extends from the egestion opening 124, and is located above the urine storage container 140, wherein the inclined classifying part 110 is located in the guide concavity 126. The guide concavity 126 includes a bottom portion 126b and a drain outlet 126h, wherein the drain outlet 126h is formed in the bottom portion 126b. When viewing from FIG. 1B, both of the bottom portion 126b and the drain outlet 126h are directly located below the inclined classifying part 110. The bottom portion 126b comprises a concave surface 126c, and the drain outlet 126h is formed in the concave surface 126c. The urine 12 flowing through the through holes 112 will drop on the concave surface 126c.

The urine storage container 140 includes a lid 142 and a box 144. The lid 142 is located over the box 144, and comprises a second entrance 142h, which is aligned to the drain outlet 126h. The drain outlet 126h is located at the most bottom position of the concave surface 126c corresponding to the second entrance 142h. Thus, the urine 12 can flow into the drain outlet 126h along the concave surface 126c, and flow from the drain outlet 126h via the second entrance 142h into the urine storage container 140, so that the urine 12 flowing through the through holes 112 can be stored in the urine storage container 140.

In the embodiment as illustrated in FIG. 1B, the urine 12 flows from the drain outlet 126h and the second entrance 142h along the concave surface 126c of the bottom portion 126b into the urine storage container 140. However, in other embodiments, it is unnecessary for the guide concavity 126 to have the bottom portion 126b, and it is also unnecessary for the urine storage container 140 to have the lid 142, so that the urine 12 flowing through the through holes 112 will directly drop into the box 144. Therefore, even without the bottom portion 126b and the lid 142, the urine 12 flowing through the through holes 112 still can be stored in the urine storage container 140.

Additionally, the inclined classifying part 110 can be detachably located in the guide concavity 126. Taking FIG. 1B as an example, the supporting part 120 further comprises a bump 128a and a holding protrusion 128b which are located in the guide concavity 126. A level of a top of the bump 128a relative to the urine storage container 140 is lower than a level of a top of the holding protrusion 128b relative to the urine storage container 140.

The bump 128a protrudes from the concave surface 126c, and the holding protrusion 128b is formed on a sidewall of the guide concavity 126, and protrudes from the sidewall, wherein the holding protrusion 128b is located opposite to bump 128a. The upper end 113a of the inclined classifying part 110 is located at a top of the holding protrusion 128b, and the lower end 113b thereof abuts against the bump 128a.

Thus, as shown in FIG. 1B, the inclined classifying part 110 can be obliquely located in the guide concavity 126.

It is worth mentioning that, although the inclined classifying part 110 can be located in the guide concavity 126 by use of the bump 128a and the holding protrusion 128b as shown in FIG. 1B, however, in other embodiments, even without the holding protrusion 128b, the inclined classifying part 110 still can lean against the sidewall opposite to the bump 128a, so that the inclined classifying part 110 still can be obliquely located in the guide concavity 126.

In addition, the inclined classifying part 110 still can located in the guide concavity 126 by other means. For example, the inclined classifying part 110 still can be obliquely located in the guide concavity 126 by use of screw or adhesive. Therefore, even without the bump 128a and the holding protrusion 128b in the supporting part 120 as shown in FIG. 1B, the inclined classifying part 110 still can located in the guide concavity 126 by other means. The supporting part 120 and the inclined classifying part 110 also can be made by the same material through the same process. For example, the supporting part 120 and the inclined classifying part 110 can be made by an injection molding, a three-dimensional printing or a casting. Alternatively, the supporting part 120 and the inclined classifying part 110 can be made by a raw material through a mechanical machining or a bench working, wherein such a raw material can be metal, wood or plastics.

Figure 1C:
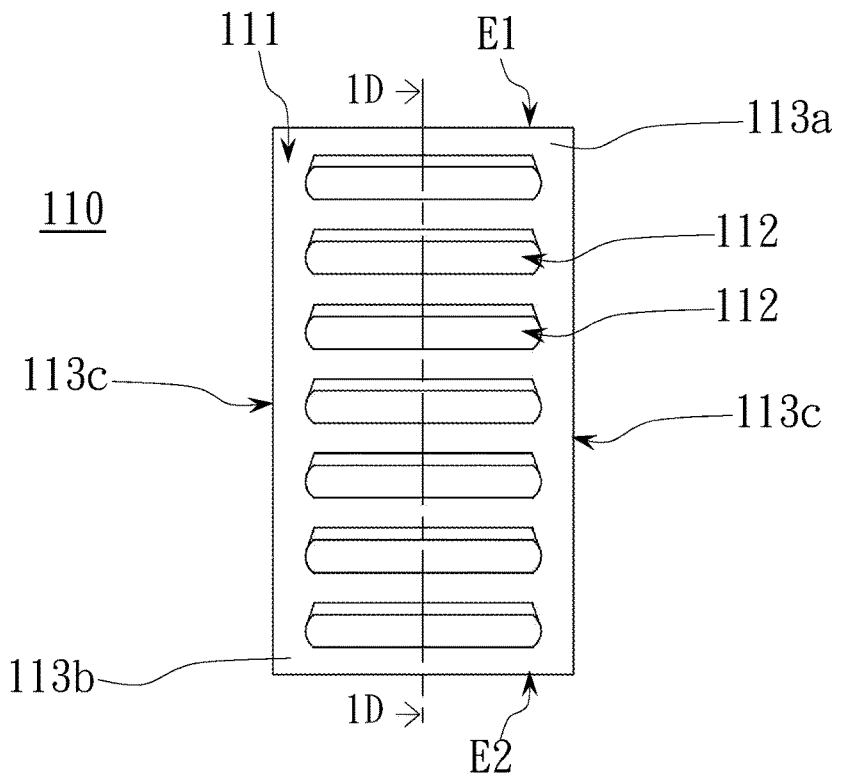
FIG. 1C is a schematic top view of a inclined classifying part as illustrated in FIG. 1A.

FIG. 1C is a schematic top view of an inclined classifying part as illustrated in FIG. 1A. Please refer to FIG. 1C, the inclined classifying part 110 further comprises a pair of tilted edges 113c opposite to each other, nearby a top edge E1 of the upper end 113a and nearby a bottom edge E2 of the lower end 113b, wherein both of the top edge E1 and the bottom edge E2 are connected to the pair of tilted edges 113c. A figure on the sloped surface 111 formed by each of the through holes 112 is closed, therefore, an edge and a sidewall of each of the through holes 112 would not be connected to any one of the tilted edges 113c, the top edge E1 and the bottom edge E2.

Figure 1D:
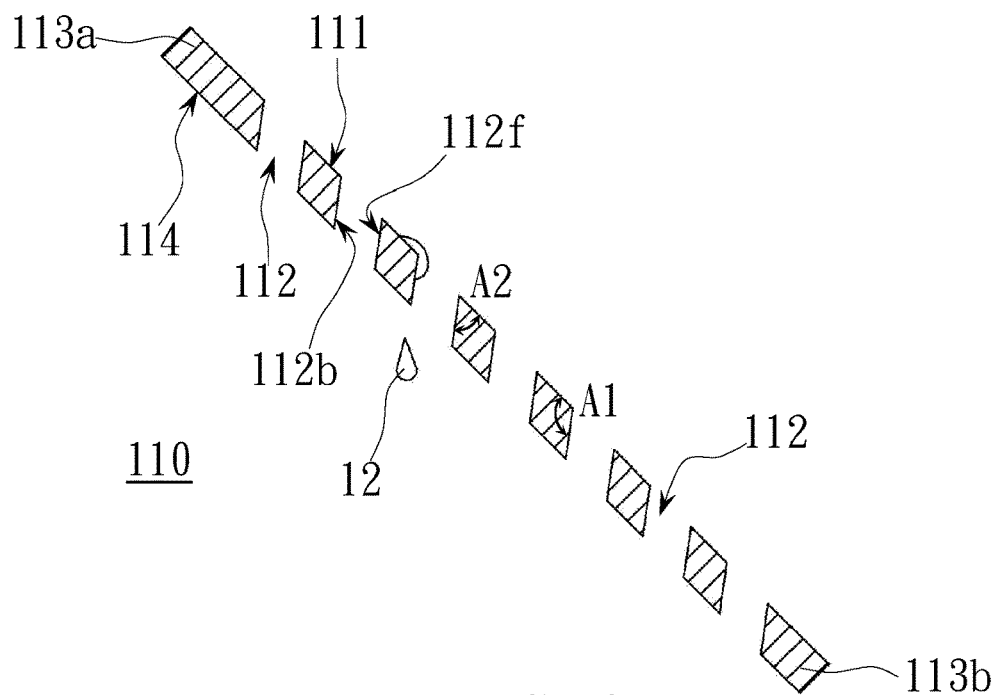
FIG. 1D is a cross-sectional schematic illustration of a cross-section along line 1D-1D as illustrated in FIG. 1C.

FIG. 1D is a cross-sectional schematic illustration of a cross-section along line 1D-1D as illustrated in FIG. 1C. Please refer to FIG. 1C and FIG. 1D, each of the through holes 112 is in a shape of strip, and each of the through holes 112 extends along a direction from one tilted edge 113c toward the other tilted edge 113c. Therefore, an extension direction of each of the through holes 112 on the sloped surface 111 would not be parallel to the pair of tilted edges 113c.

Each of the through holes 112 has a first beveled edge 112b and a second beveled edge 112f, wherein the second beveled edge 112f is opposite to the first beveled edge 112b. For example, the first beveled edge 112b can be substantially parallel to the second beveled edge 112f, so that the through holes 112 can have an uniform pore size. In addition, the first beveled edge 112b and the second beveled edge 112f, which are substantially parallel to each other, can be perpendicular to a horizontal surface (not shown). Within the same through hole 112, A level of the first beveled edge 112b relative to the lower end 113b is higher than a level of the second beveled edge 112f relative to the lower end 113b.

The inclined classifying part 110 further comprises a bottom surface 114, the first angle A1 and the second angle A2. The bottom surface 114 is opposite to the sloped surface 111. The first angle A1 is formed between the sloped surface 111 and the first beveled edge 112b, and the second angle A2 is formed between the sloped surface 111 and the second beveled edge 112f, wherein the first angle A1 is larger than the second angle A2. The first beveled edge 112b can guide the flow of the urine 12, so that the urine 12 on the sloped surface 111 can flow along the first beveled edge 112b, and can assist the urine 12 in flowing through the through holes 112. In addition, it is to be understood that, in other embodiments, it is unnecessary for the first angle A1 to be larger than the second angle A2. For example, both of the first angle A1 and the second angle A2 may substantially be a right angle. Therefore, the first angle A1 and the second angle A2 as illustrated in FIG. 1D is merely exemplified.

Please refer to FIG. 1A and FIG. 1B, the toilet for cat 100 further includes a case 150. The supporting part 120 is fixed on the case 150. For example, the supporting part 120 can be fixed on the case 150 via adhesive, nailing or interference fitting. The supporting part 120 also can be detachably assembled on the case 150. For example, the supporting part 120 can be assembled on the case 150 via screwing, transition fitting or clearance fitting, wherein the supporting part 120 and the inclined classifying part 110 also can be made by the same material through the same process. In addition, the supporting part 120 and the case 150 also can be made by the same material through the same process. For example, the supporting part 120 and the case 150 can be made by an injection molding, a three-dimensional printing or a casting. Alternatively, the supporting part 120 and the case 150 can be made by a raw material through a mechanical machining or a bench working, wherein such a raw material can be metal, wood or plastics.

The case 150 is provided with a tread 152, which is appearing around the supporting part 120. The tread 152 is suitable for the cat 10's stamp thereon, so it become easy for the cat 10 to climb the supporting surface 122, especially for a small-sized cat (for example, a kitten) to climb the supporting surface 122. Both of the feces storage container 130 and the urine storage container 140 are located in the case 150. Therefore, after the cat 10 uses the toilet for cat 100 for defecation and urination, the feces 11 and the urine 12 can be stored in the case 150. In addition, in order to weaken smelly odor of the feces 11 and the urine 12, it is possible to put an air freshener in the case 150, and such an air freshener can be a mothball or florida water.

Figure 1E:
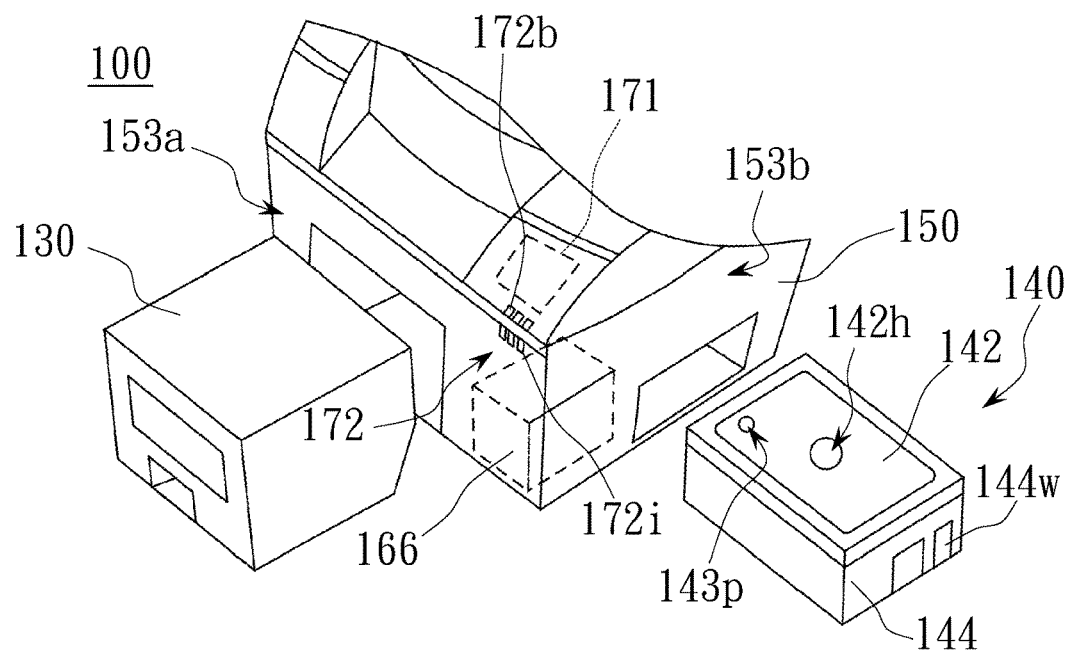
FIG. 1E is a partial schematic view of the toilet for cat as illustrated in FIG. 1A.

FIG. 1E is a schematic partial view of the toilet for cat as illustrated in FIG. 1A. Please refer to FIG. 1A, FIG. 1B and FIG. 1E, the feces storage container 130 and the urine storage container 140 can be detachably assembled in the case 150. Taking FIG. 1E as an example, the feces storage container 130 and the urine storage container 140 can be two drawers, respectively. In addition, the case 150 further comprises a first flat side 153a and a second flat side 153b, wherein the first flat side 153a and the second flat side 153b are not coplanar, and the feces storage container 130 and the urine storage container 140 expose from the first flat side 153a and the second flat side 153b, respectively.

The feces storage container 130 can have a first light-transmitting window 136, and the urine storage container 140 can have a second light-transmitting window 144w, wherein both of the first light-transmitting window 136 and the second light-transmitting window 144w expose from an outer surface of the case 150. Taking FIG. 1A as an example, the first light-transmitting window 136 and the second light-transmitting window 144w expose from the first flat side 153a and the second flat side 153b, respectively. The first light-transmitting window 136 and the second light-transmitting window 144w may be made of glass or polymethylmethacrylate (PMMA, i.e. acrylic).

The first light-transmitting window 136 and the second light-transmitting window 144w are transparent or translucent. When the first light-transmitting window 136 and the second light-transmitting window 144w are translucent, the first light-transmitting window 136 and the second light-transmitting window 144w can only allow a particular wavelength range of visible light to pass through, for example, only allow a red light or a green light to pass through. Therefore, the translucent first light-transmitting window 136 and the second light-transmitting window 144w will be in a specific color, for example, in a red or green color.

The first light-transmitting window 136 and second light-transmitting window 144w may be transparent or translucent, therefore the insides of the feces storage container 130 and the urine storage container 140 may be observed from the first light-transmitting window 136 and the second light-transmitting window 144w. Thus, a cat's owner may, without opening the feces storage container 130 and urine storage container 140, observe through the first light-transmitting window 136 to find if there are feces 11 in the feces storage container 130, and observe trough the second light-transmitting window 144w to find if there is urine 12 in the urine storage container 140. In addition, in the urine storage container 140 as shown in FIG. 1E, the box 144 includes a second light-transmitting window 144w, and the lid 142 may has a vent 143p.

Figure 1F:
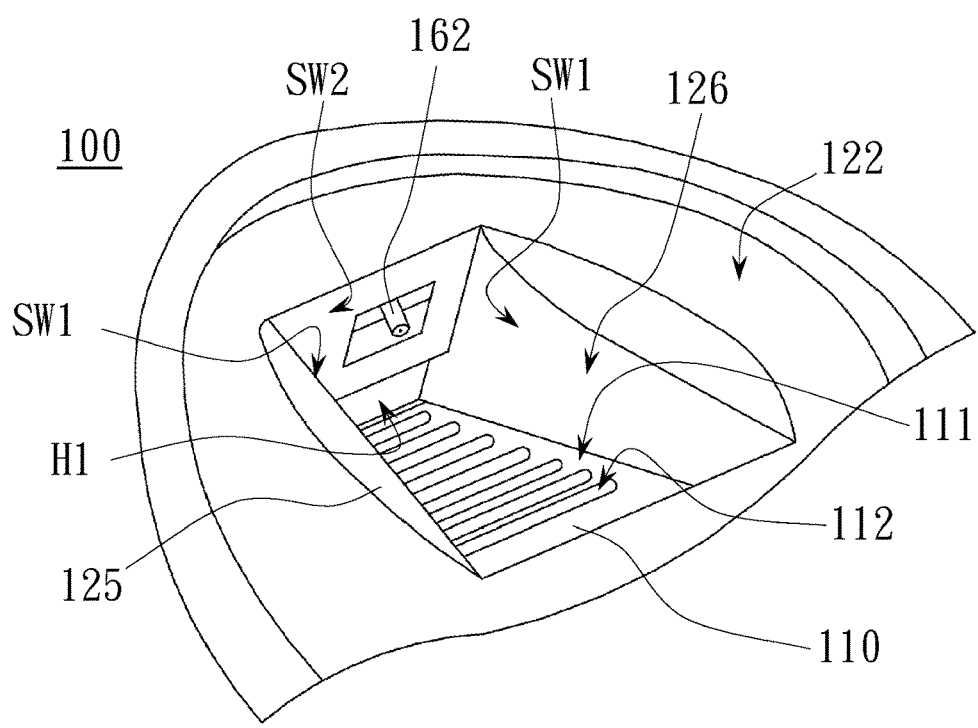
FIG. 1F depicts a partial enlarged view of the egestion opening of the supporting part as illustrated in FIG. 1A.

FIG. 1F is a partial enlarged view of the egestion opening of the supporting part shown in FIG. 1A. Please refer to FIG. 1A, FIG. 1B and FIG. 1F, the guide concavity 126 further includes a pair of first sidewalls SW1 and a second sidewall SW2 opposite to each other, wherein the first sidewalls SW1 and the second sidewall SW2 all extend from the egestion opening 124 to the bottom portion 126b. In addition, the supporting part 120 may have a pair of chamfers 125, and each of the chamfers 125 is formed between the supporting surface 122 and one of the first sidewalls SW1, as shown in FIG. 1A and FIG. 1F.

The inclined classifying part 110 is located between the pair of first sidewalls SW1, and the second sidewall SW2 is connected between the pair of first sidewalls SW1, and is opposite to the sloped surface 111. The guide concavity 126 further includes an opening H1, which is formed between the second sidewall SW2 and the bottom portion 126b. The opening H1 connects to the first entrance 132, and lower end 113b of the inclined classifying part 110 is arranged at the opening H1. Thus, the feces 11 rolling along the sloped surface 111 would enter the feces storage container 130 through the opening H1 and the first entrance 132.

The toilet for cat 100 further includes a spray assembly 160. The spray assembly 160 includes a nozzle 162 and a pump 164. The nozzle 162 is arranged below the supporting surface 122, and appears on the second sidewall SW2, but does not protrude from the second sidewall SW2. The nozzle 162 is inclined toward the bottom portion 126b, and is aligned to the sloped surface 111. The pump 164 is connected to the nozzle 162, and is placed within the case. The pump 164 can transport cleaning liquid to the nozzle 162, so that the nozzle 162 can spray cleaning liquid to the sloped surface 111, to clean the sloped surface 111 and the guide concavity 126, wherein the cleaning liquid, for example, is water, or a solution containing deodorant and/or bactericide.

In addition, the spray assembly 160 may be an ultrasonic nebulizer; therefore, the nozzle 162 will spray tiny liquid beads, to avoid exceeding cleaning liquid deposited on the sloped surface 111 and within the guide concavity 126. Thus, the guide concavity 126 is kept from being too wet and cleaning liquid is kept from flowing into the feces storage container 130, and thereby preventing the breeding of mosquitoes and flies.

Please refer to FIG. 1E and FIG. 1F, the spray assembly 160 further includes a reservoir 166 connected to the pump 164. In particular, the reservoir 166 may be connected to the pump 164 through a pipe line (not shown), wherein both the pipe line and the reservoir 166 are arranged within the case 150. The reservoir 166 can reserve cleaning liquid, and supply cleaning liquid to the pump 164, so that the nozzle 162 can spray cleaning liquid. The reservoir 166 and partial of the case 150 surrounding the peripheral reservoir 166 may be transparent or translucent, so that a cat's owner can observe and estimate the amount of clean liquid reserved within the reservoir 166 from outside of the box 150. In addition, the case 150 or the supporting part 120 may have an injection port (not shown), which appears on an outer surface of the toilet for cat 100, and is connected to the reservoir 166. Thus, the cat's owner may supplement cleaning liquid from the injection port of the reservoir 166.

In the embodiment shown in FIG. 1E, the reservoir 166 is located within the case 150. However, in other embodiments, the reservoir 166 may also be located outside the case 150 for facilitating a cat's owner to supplement cleaning liquid or change the reservoir 166. In addition, the spray assembly 160 may not include the reservoir 166. For example, the nozzle 162 may spray running water, and the pump 164 may be connected to a supply, for example, a water-tap, through a pipeline (not shown). Therefore, the cleaning liquid sprayed by the nozzle 162 is not necessary to come from the reservoir 166.

Figure 1G:
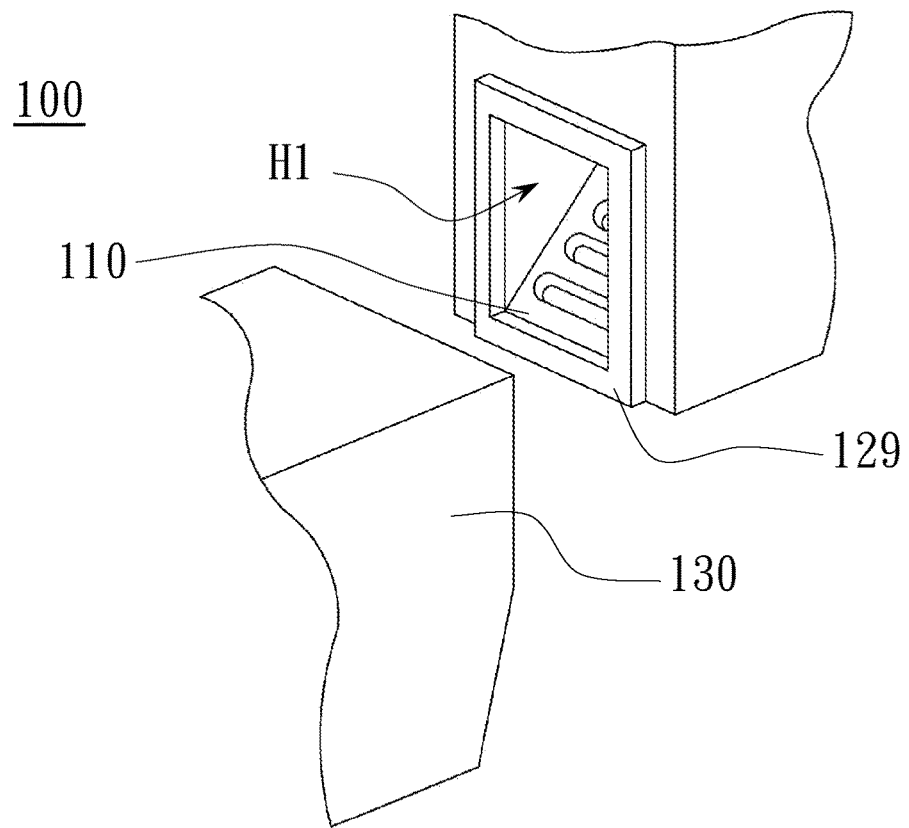
FIG. 1G is a three-dimensional schematic illustration of a feces storage container at a guiding slot opening as illustrated in FIG. 1B.

FIG. 1G is a three-dimensional schematic illustration of a feces storage container at a guiding slot opening as illustrated in FIG. 1B. Please refer to FIG. 1B and FIG. 1G, the supporting part 120 may have an extension portion 129, which is located around the opening H1, wherein the extension portion 129 may be a ring in shape, as shown in FIG. 1G. The extension portion 129 can fit with the first entrance 132, and the fitness between the extension portion 129 and the first entrance 132 may be a transition fit or a clearance fit, so that it will not be difficult to pull the feces storage container 130 off the case 150. The extension portion 129 is fit to the first entrance, which allows the extension portion 129 extending into the first entrance 132. Accordingly, it ensures that the feces 11 passing through the opening H1 would enter into the feces storage container 130, and thus can reduce the odor leakage generated from the feces 11.

Figure 1H:
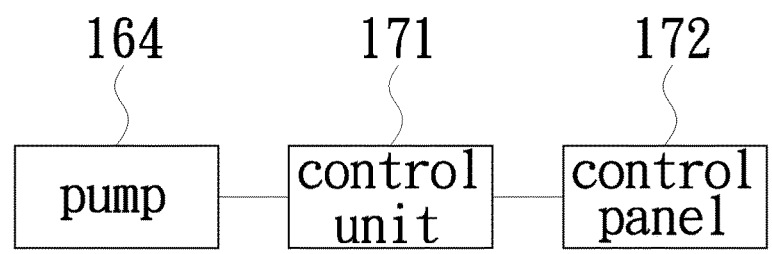
FIG. 1H is a schematic block diagram of the toilet for cat as illustrated in FIG. 1B.

FIG. 1H is a schematic block diagram of the toilet for cat as illustrated in FIG. 1B, wherein FIG. 1H indicates the circuit layout of the toilet for cat 100. Please refer to FIG. 1E and FIG. 1H, the toilet for cat 100 further includes the controller unit 171, which is located within the supporting part 120, as shown in FIG. 1E. However, the controller unit 171 may also be located within the case 150. Therefore, the controller unit 171 is not limited to be located in the supporting part 120. In addition, the controller unit 171 may be a programmable logic controller (PLC), a microcontroller (MCU), a microprocessor (μP) or a programmable logic device (PLD).

Please refer to FIG. 1B and FIG. 1H, the controller unit 171 is electrically connected to the pump 164, and thus is capable of controlling the nozzle 162 to spray cleaning liquid. For example, the controller unit 171 may has a timer (not shown), and the controller unit 171 may control the pump 164 by using the timer, and thus has the nozzle 162 to spray cleaning liquid periodically (for example, every 8 or 12 hours), for keeping the toilet for cat 100 clean.

In addition, the controller unit 171 may includes a clock, by which a current time can be obtained accordingly in any time. The controller unit 171 may control the pump 164 according to the clock, so as to have the nozzle 162 spray cleaning liquid in a specific time period. For example, the controller unit 171 may have the nozzle 162 to spray cleaning liquid at A.M. 5:00 every day. Alternatively, the controller unit 171 may have the nozzle 162 spray the cleaning liquid at 4:00 A.M. every Monday, Wednesday and Friday.

The toilet for cat 100 further includes the control panel 172, which appears on an outer surface of the toilet for cat 100. For example, the control panel 172 appears on the supporting part 120 and the case 150, and is placed between the junction of both, as shown in FIG. 1E. However, in other embodiments, the control panel 172 may appear on an outer surface of only one of the supporting part 120 and the case 150.

The control panel 172 can indicate the status of the toilet for cat 100. For example, the control panel 172 may includes at least one indicator light 172$i$, which may be a light emitting diode (LED), and the indicator light 172$i$ can indicate whether the toilet for cat 100 is power-on or power-off. The control panel 172 includes operation functions. For example, the control panel 172 further includes at least one bottom 172$b$ for turning on or off the toilet for cat 100.

Although the control panel 172 shown in FIG. 1E includes the indicator light 172$i$ and the bottom 172$b$, however, in other embodiments, the control panel 172 may be other human-machine interface (HMI), e.g. a touch screen. Therefore, the control panel 172 is not limited to only include the indicator light 172$i$ and the bottom 172$b$.

Figure 2A:
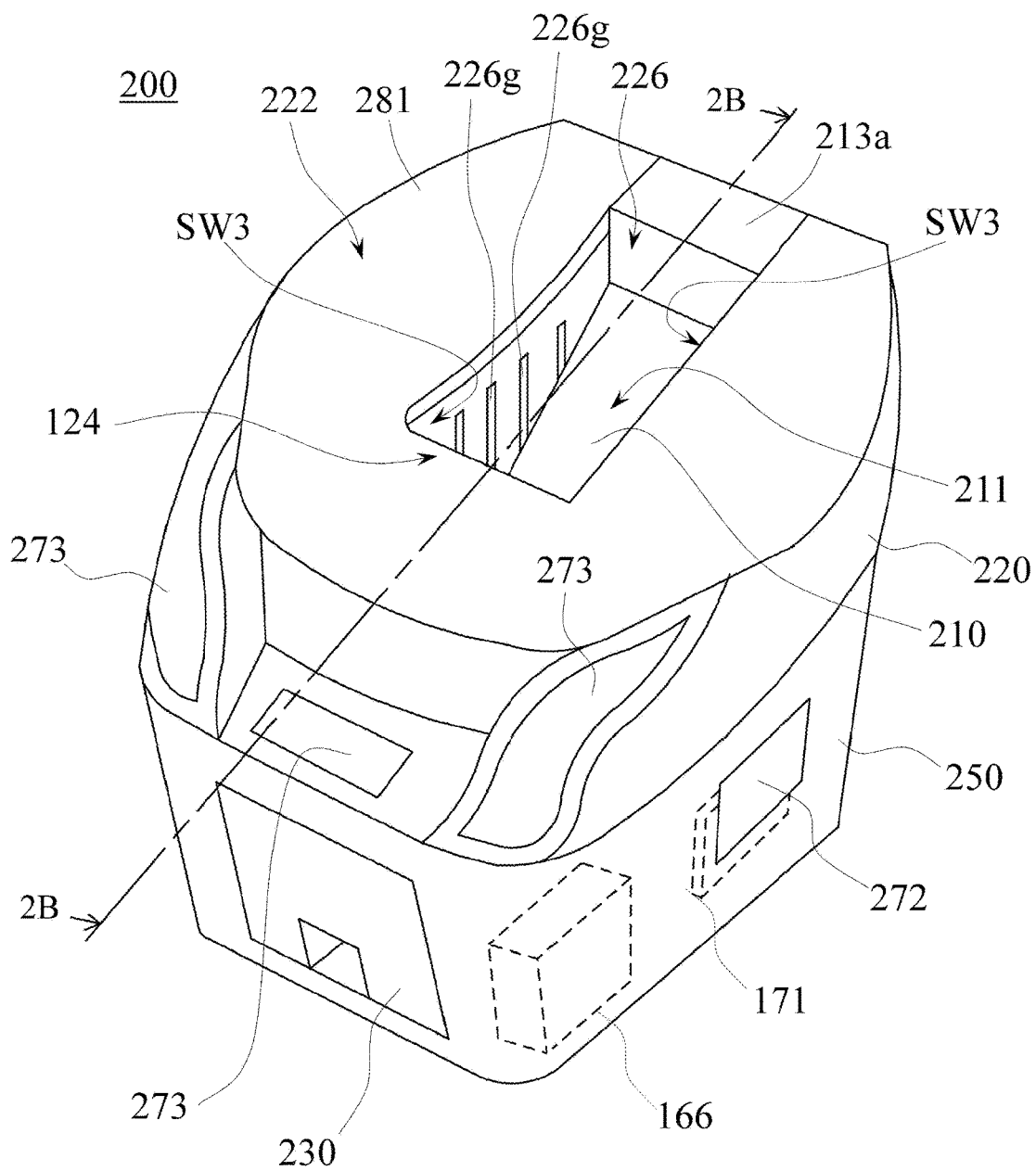
FIG. 2A is a three-dimensional schematic illustration of a toilet for cat according to another embodiment of the invention.
Figure 2B:
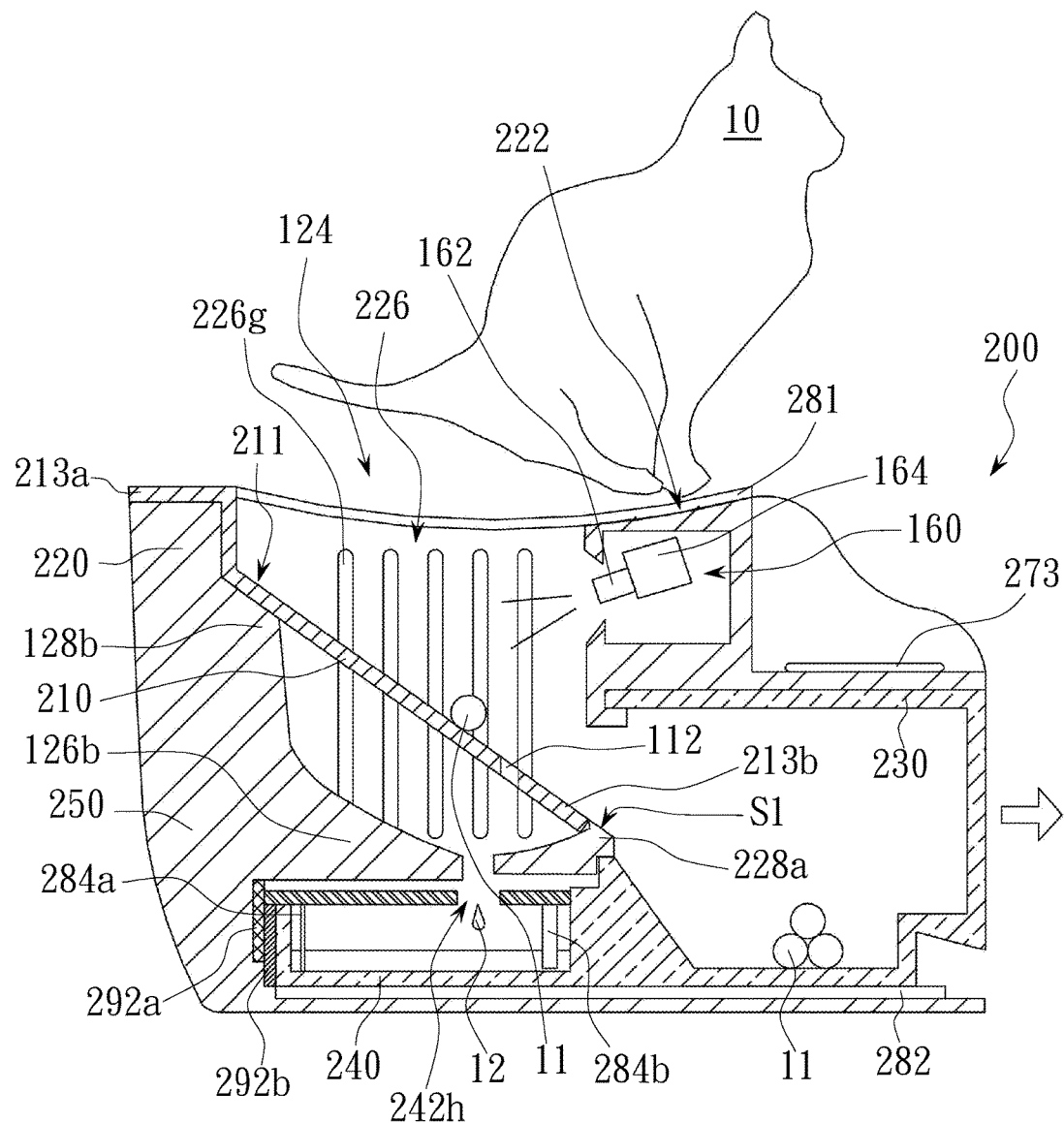
FIG. 2B is a cross-sectional schematic illustration of a cross-section along line 2B-2B as illustrated in FIG. 2A.

FIG. 2A is a three-dimensional schematic illustration of a toilet for cat according to another embodiment of the invention, and FIG. 2B is a cross-sectional schematic illustration of a cross-section along line 2B-2B as illustrated in FIG. 2A. Please refer to FIG. 2A and FIG. 2B. The toilet for cat 200 shown in FIG. 2A and FIG. 2B is similar to the toilet for cat 100. For example, the toilet for cat 200 further includes an inclined classifying part 210, a supporting part 220, a feces storage container 230, a urine storage container 240, a case 250, a spray assembly 160, a controller unit 171 and a control panel 272. The following statement will focus on the differences between the toilet for cat 200 and 100, and the same features of both will not be repeatedly disclosed. In addition, in order to simplify the contents, some elements with similar structures and the same functions will be expressed with the same label.

Please refer to FIG. 2A and FIG. 2B. Different from the above-mentioned statements, the inclined classifying part 110 of the toilet for cat 200 only includes a through hole 112, and the through hole 112 is close to the nearby of lower end 213$b$ of the inclined classifying part 210, but is apart from the upper end 213$a$ of the inclined classifying part 210. Please refer to FIG. 2C, which is a schematic block diagram of the toilet for cat as illustrated in FIG. 2A. In the inclined classifying part 210, the distance between the through hole 112 and the upper end 213$a$ is the first distance D1, and the distance between the through hole 112 and the lower end 213$b$ is the second distance D2. The first distance D1 is larger than the second distance D2 and the ratio between the first distance D1 and the second distance D2 is larger than or equal to 2, therefore the through hole 112 is closer to the lower end 213$b$, as shown in FIG. 2B and FIG. 2C.

Although the inclined classifying part 210 only has a through hole 112, however, the inclined classifying part 210 still can separate excreta of the cat 10 into feces 11 and urine 12. In details, when the cat 10 excreted the feces 11 or the urine 12, feces 11 and urine 12 would move along the sloped surface 211 of the inclined classifying part 210. However, the urine 12 will still be dropped into the urine storage container 240 form the through hole 112, and the feces 11 would move along the sloped surface 211, and enter the feces storage container 230. Thus, feces 11 and urine 12 are stored separately.

Figure 2C:
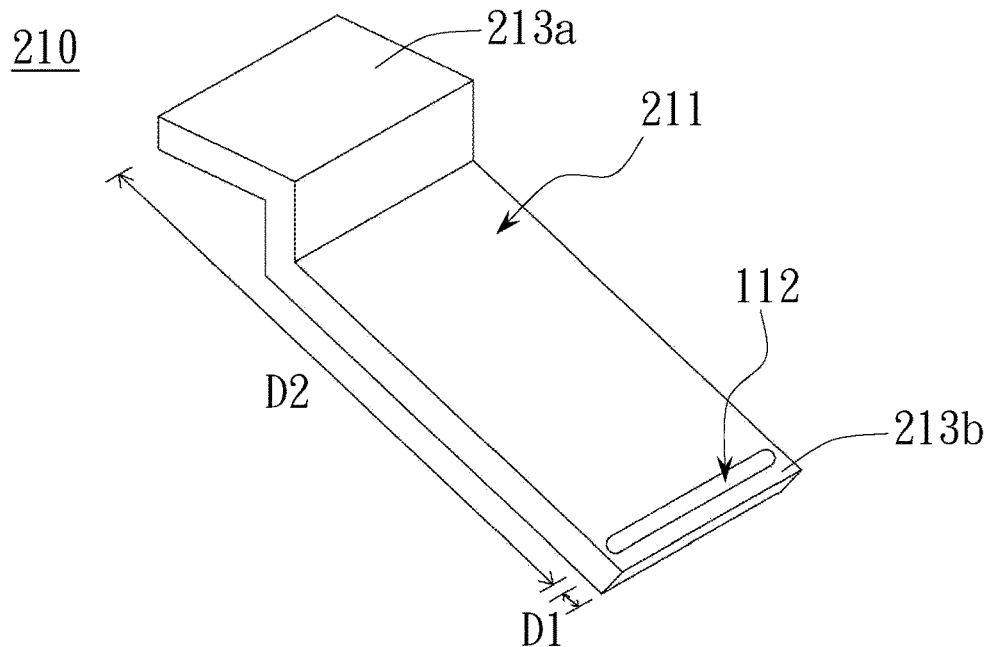
FIG. 2C is a schematic block diagram of the toilet for cat as illustrated in FIG. 2A.

Additionally, the upper end 213$a$ of the inclined classifying part 110 as shown in FIG. 2B and FIG. 2C is different from the upper end 113$a$. In particular, in the inclined classifying part 210, the upper end 213$a$ is a fixed end, and the upper end 213$a$ is a sheet in shape. The upper end 213$a$ is fixed on supporting part 220 by use of screwing, adhesive or buckling. Since the upper end 213$a$ is fixed on the supporting part 220, the inclined classifying part 210 may be fixed on the supporting part 220, even without the bump 228$a$ and the holding protrusion 128$b$. Different from the bump 128$a$ shown in FIG. 1B, the bump 228$a$ shown in FIG. 2B has an inclined guiding surface S1, and the inclined guiding surface S1 will flush with the sloped surface 211, so as to facilitate feces 11 on the inclined guiding surface 211 entering the feces storage container 230.

Please refer to FIG. 2A and FIG. 2B, the supporting part 220 further has an egestion opening 124 and a guide concavity 226. The guide concavity 226 further has a pair of first sidewalls SW3 opposite to each other, and the bottom portion 126$b$. However, the first sidewalls SW1 shown in FIG. 1A is flat, while the first sidewalls SW3 shown in FIG. 2A is not flat. In particular, the guide concavity 226 further includes several guiding stripes 226$g$ formed on the pair of first sidewalls SW3, and the guiding stripes 226$g$ extend from the egestion opening 124 to the bottom portion 126$b$. In addition, these guiding stripes 226$g$ may all grousers or grooves. Alternatively, one of the guiding stripes 226$g$ is groove, and the other one of the guiding stripes 226$g$ is groove.

When the nozzle 162 sprays cleaning liquid to the sloped surface 211, these guiding stripe 226$g$ can accumulate the sprayed cleaning liquid, and guide cleaning liquid to flow toward the bottom portion 126$b$. Thus, it facilitates cleaning liquid sprayed by the nozzle 162 flowing into the urine storage container 240, and keeps cleaning liquid from flowing into the feces storage container 230, and thus keeps the feces 11 in the feces storage container 230 dry, so that maggots are not easily breeding in the feces 11.

Figure 2D:
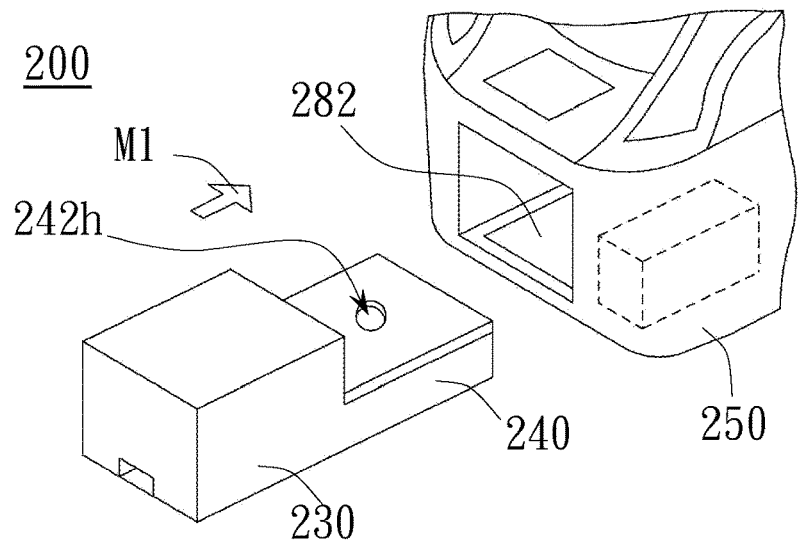
FIG. 2D depicts a partial enlarged view of the egestion opening of the supporting part as illustrated in FIG. 2A.

FIG. 2D is a partial enlarged view of the egestion opening of the supporting part as illustrated in FIG. 2A. Please refer to FIG. 2A, FIG. 2B and FIG. 2D. The feces storage container 230 and the urine storage container 240 may connect to each other to be integrated as a drawer capable of being assembled within the case 250, wherein the feces storage container 230 and the urine storage container 240 are arranged along a movable direction M1 of the drawer in the case 250. Referring to FIG. 2A and FIG. 2D, the feces storage container 230 is located at the outside of the drawer, while the urine storage container 240 is located at the inner side of the drawer. When the drawer is retrieved within the case 250, the case 250 would expose the feces storage container 230, and hind the urine storage container 240, as shown in FIG. 2A.

It is noted that, the urine storage container 240 shown in FIG. 2B and FIG. 2D includes a second entrance 242$h$ for entering the urine 12. However, different from the above-mentioned urine storage container 140 (Please refer to FIG. 1E), the urine storage container 240 may not have the vent 143p, and both the urine storage container 140 and 240 are not necessary to have the vent 143p.

Figure 2E:
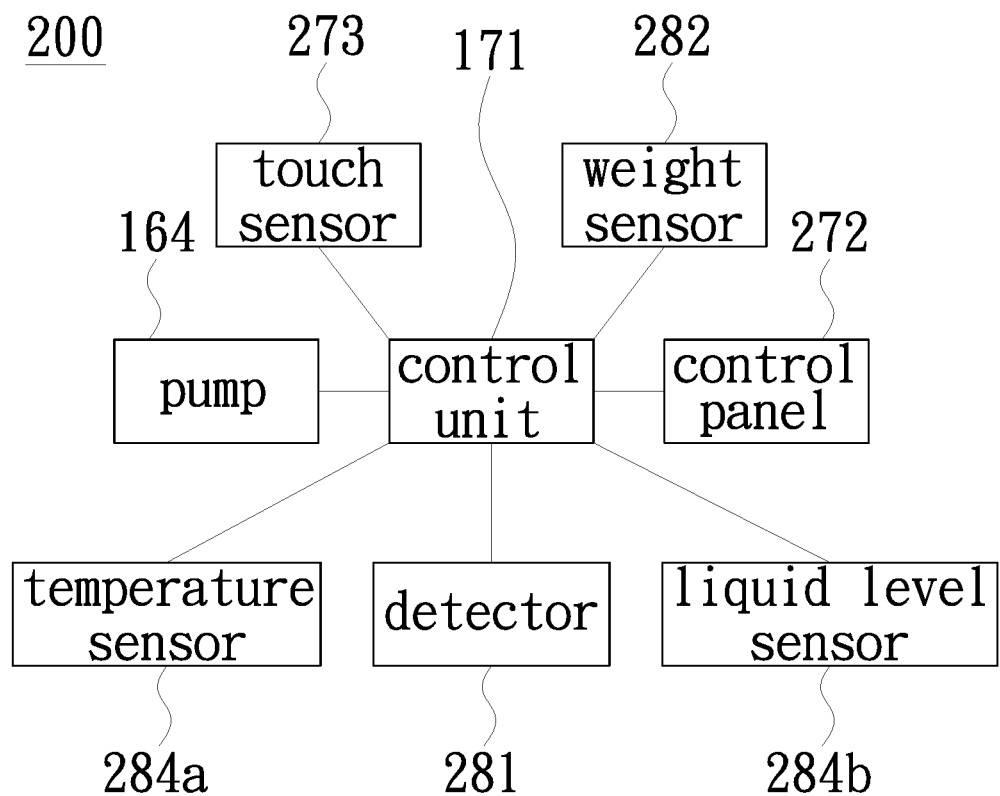
FIG. 2E is a schematic block diagram of the toilet for cat as illustrated in FIG. 2A.

FIG. 2E is a schematic block diagram of the toilet for cat as illustrated in FIG. 2A. Please refer to FIG. 2A, FIG. 2B and FIG. 2E, the toilet for cat 200 includes not only the controller unit 171 and the control panel 272, and further comprises a detector 281. The control panel 272 may be a touch screen, and the basic function of the control panel 272 is the same with the control panel 172, therefore will not be repeatedly disclosed here. The detector 281 can detect whether the cat 10 presents at the supporting surface 222 of the supporting part 220 or not. When the detector 281 detects that the cat 10 on the supporting surface 222 leaves the toilet for cat 200 after defecation or urination, the controller unit 171 would start the pump 164 to allow the nozzle 162 to spray the cleaning liquid, wherein the cleaning liquid is supplied from the reservoir 166 located within the case 250.

The detector 281 is a pressure sensor, which has several thin-film switches or several bottom switches. Alternatively, the pressure sensor may be a product of Uneo Inc., and may be arranged on the supporting surface 222. The supporting surface 222 may be a concave surface. The detector 281 can detects the pressure asserted by the cat 10 on supporting surface 222 to the detector 281, and can detect and monitor the area on the supporting surface 222 pressed by the cat 10, and thus is capable of detecting whether the cat 10 is awake or lying on the supporting surface 222.

The controller unit 171 can identify the area on the supporting surface 222 pressed by the cat 10 through the detector 281, so as to identify whether the cat 10 has leaved the toilet for cat 200 or not. When the toilet for cat 200 detects through detector 281 (pressure sensor) that the cat 10 has leaved toilet for cat 200, the controller unit 171 would start the pump 164 to allow the nozzle 162 to spray the cleaning liquid, so as to clean the inclined classifying part 210 and the guide concavity 226.

Additionally, toilet for cat 200 further includes several touch sensors 273, and these touch sensors 273 are arranged on an outer surface of the toilet for cat 200. Please refer to FIG. 2A, for example, these touch sensors 273 are arranged at the case 250 and the supporting part 220. These touch sensors 273 may be the same as the detector 281, which are all pressure sensors. The touch sensors 273 can detect whether the cat 10 touches an outer surface of the toilet for cat 200 or not. When the touch sensors 273 detect that the cat 10 touches an outer surface of the toilet for cat 200, the controller unit 171 would turn off the pump 164. Accordingly, the spray assembly 160 which is under a cleaning process stops spraying cleaning liquid, to avoid the cat 10 from being sprayed by the cleaning liquid from the spray assembly 160.

Although several touch sensors 273 are illustrated in FIG. 2A, however, in other embodiments, the toilet for cat 200 may only include one touch sensor 273. Therefore, the number of the touch sensors 273 shown in FIG. 2A is merely illustrative, and is not intended to limit the toilet for cat 200 to include multiple touch sensors 273. Additionally, the touch sensors 273 may be other detectors than a pressure sensor, e.g. the infrared proximity sensor. Therefore, the touch sensors 273 are not necessary to be the same type of detector with the detector 281.

Please refer to FIG. 2B, FIG. 2D and FIG. 2E, except touch sensors 273, the toilet for cat 200 further include one or multiple weight sensor(s) 282. The weight sensor 282 is electrically connected to the controller unit 171, and is under the control of the controller unit 171. The weight sensor 282 is arranged on at least one of the bottom portion feces storage container 230 and the bottom portion of the urine storage container 24. As shown in FIG. 2B, e.g., the weight sensor 282 is located at the bottom portions of both the feces storage container 230 and the urine storage container 240. In other words, the feces storage container 230 and the urine storage container 240 are disposed on the same weight sensor 282.

The weight sensor 282 can detect and monitor the weight variance of the feces storage container 230 and the urine storage container 240 to determine whether the cat 10 has excreted the feces 11 or the urine 12. In addition, the weight sensor 282 may be a pressure sensor, and may be the same type with the detector 281. When the detector 281 detects that the cat 10 has left the supporting surface 222, and the weight sensor 282 detects that the weight of the feces storage container 230 or the urine storage container 240 changes, the controller unit 171 would start the pump 164 to allow the nozzle 162 to spray the cleaning liquid for cleaning the inclined classifying part 210 and the guide concavity 226.

Although there is only one weight sensor 282 shown in FIG. 2B, however, in other embodiments, the number of the weight sensors 282 may be at least two. Wherein, a weight sensor 282 is located at the bottom portion of the feces storage container 230, the other weight sensor 282 is located at the bottom portion of the urine storage container 240. In addition, the weight sensor 282 may be made of piezoelectric materials, and may be of different types with the detector 281.

Please refer to FIG. 2B and FIG. 2E, the toilet for cat 200 further includes a temperature sensor 284a, which is arranged at the urine storage container 240, and is electrically connected to the controller unit 171. The temperature sensor 284a, e.g., is an electronic thermometer, which can measure the inner temperature of the urine storage container 240. Since the urine 12 usually has a temperature higher than a room temperature when the cat 10 has just excreted it, the controller unit 171 may identify that the cat 10 has peed according to the raised temperature detected by the temperature sensor 284a. When the detector 281 detects that the cat 10 has leaved form the supporting surface 222, and the temperature sensor 284a detects that the temperature of the urine storage container 240 rises, it is identified that the cat 10 has peed by using the toilet for cat 200. At this moment, the controller unit 171 would start the pump 164, so as to allow the nozzle 162 to spray the cleaning liquid to clean the inclined classifying part 210 and the guide concavity 226.

Additionally, the toilet for cat 200 further includes a liquid level sensor 284b. The liquid level sensor 284b is electrically connected to the controller unit 171, and is arranged within the urine storage container 240. The liquid level sensor 284b can detects the liquid level of the urine 12 in the urine storage container 240, any can be one of presented liquid level sensors, e.g., a liquid level sensor, a liquid level sensor, or a liquid level sensor.

When the liquid level sensor 284b detects that the liquid level of the urine 12 in the urine storage container 240 exceeds a standard level, the controller unit 171 would have the control panel 272 generate a reminder message, which is, e.g., a blinking screen of a touch screen or sound generated by a buzzer, so as to notify the cat's owner that the amount of the urine 12 in the urine storage container 240 has exceeded the standard level, and the urine storage container 240 must be cleaned, or leakage of the urine 12 or odor of the urine 12 in the urine storage container 240 may happen.

Additionally, please refer to FIG. 2B, the toilet for cat 200 may include a pair of electric connecting parts 292a and 292b. The electric connecting parts 292a are fixed in the case 250, and are electrically connected to the controller unit 171. The electric connecting part 292b is fixed in the urine storage container 240, and is electrically connected to the temperature sensor 284a and the liquid level sensor 284b. When the urine storage container 240 is assembled in the case 250, the pair of electric connecting parts 292a and 292b would be electrically connected to each other, so that the controller unit 171 can be electrically connected to the temperature sensor 284a and the liquid level sensor 284b through the pair of the electric connecting parts 292a and 292b.

As shown in FIG. 2B, e.g., each of the electric connecting parts 292a and 292b is one metal sheet or multiple metal sheets. The electric connecting part 292b is fixed on the rear side of the urine storage container 240, and the electric connecting parts 292a is fixed on the inner wall of the case 250. When the urine storage container 240 is inserted and assembled in the case 250, the electric connecting parts 292a would contact the electric connecting parts 292b, so that the electric connecting parts 292a and 292b are electrically connected to each other. Thus, the pair of electric connecting parts 292a and 292b can make the controller unit 171 to be electrically connected to the temperature sensor 284a and the liquid level sensor 284b, so that the controller unit 171 is capable of controlling the temperature sensor 284a and the liquid level sensor 284b.

It is worthy to notify that the touch sensors 273, the weight sensor 282, the temperature sensor 284a, the liquid level sensor 284b and the electric connecting parts 292a and 292 of the toilet for cat 200 may further be applied to the above-mentioned toilet for cat 100. In details, the touch sensors 273 may further be arranged on an outer surface toilet for cat 100, and the weight sensor 282 may be arranged in at least one of the bottom portions of the feces storage container 130 and the urine storage container 140. The temperature sensor 284a, the liquid level sensor 284b and electric connecting parts 292b may all be arranged in the urine storage container 140, and the electric connecting parts 292a may be arranged in the case 50. In addition, the control panel 172 of the toilet for cat 100 may be replaced by the control panel 272.

Figure 3A:
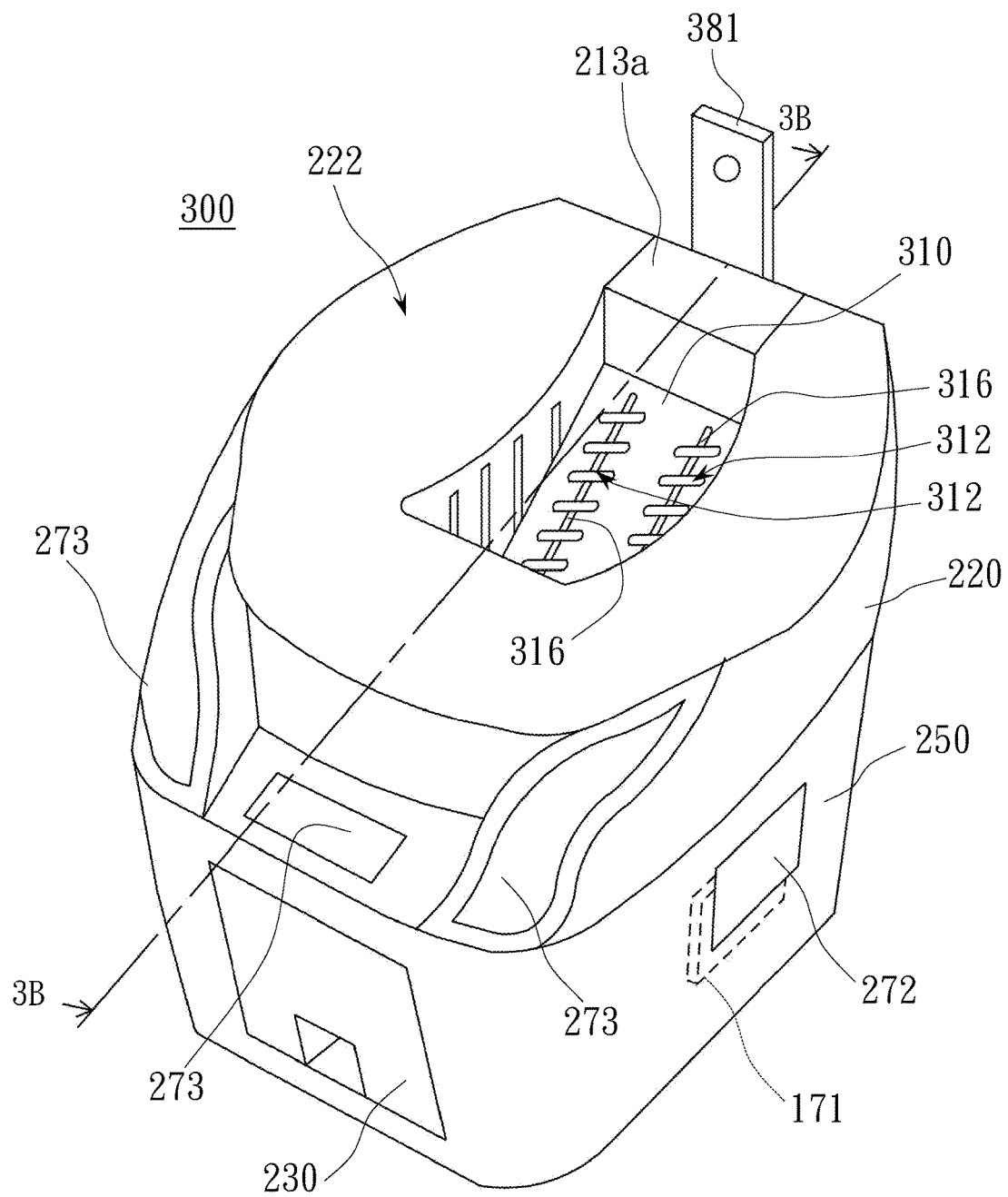
FIG. 3A is a three-dimensional schematic illustration of a toilet for cat according to another embodiment of the invention.
Figure 3B:
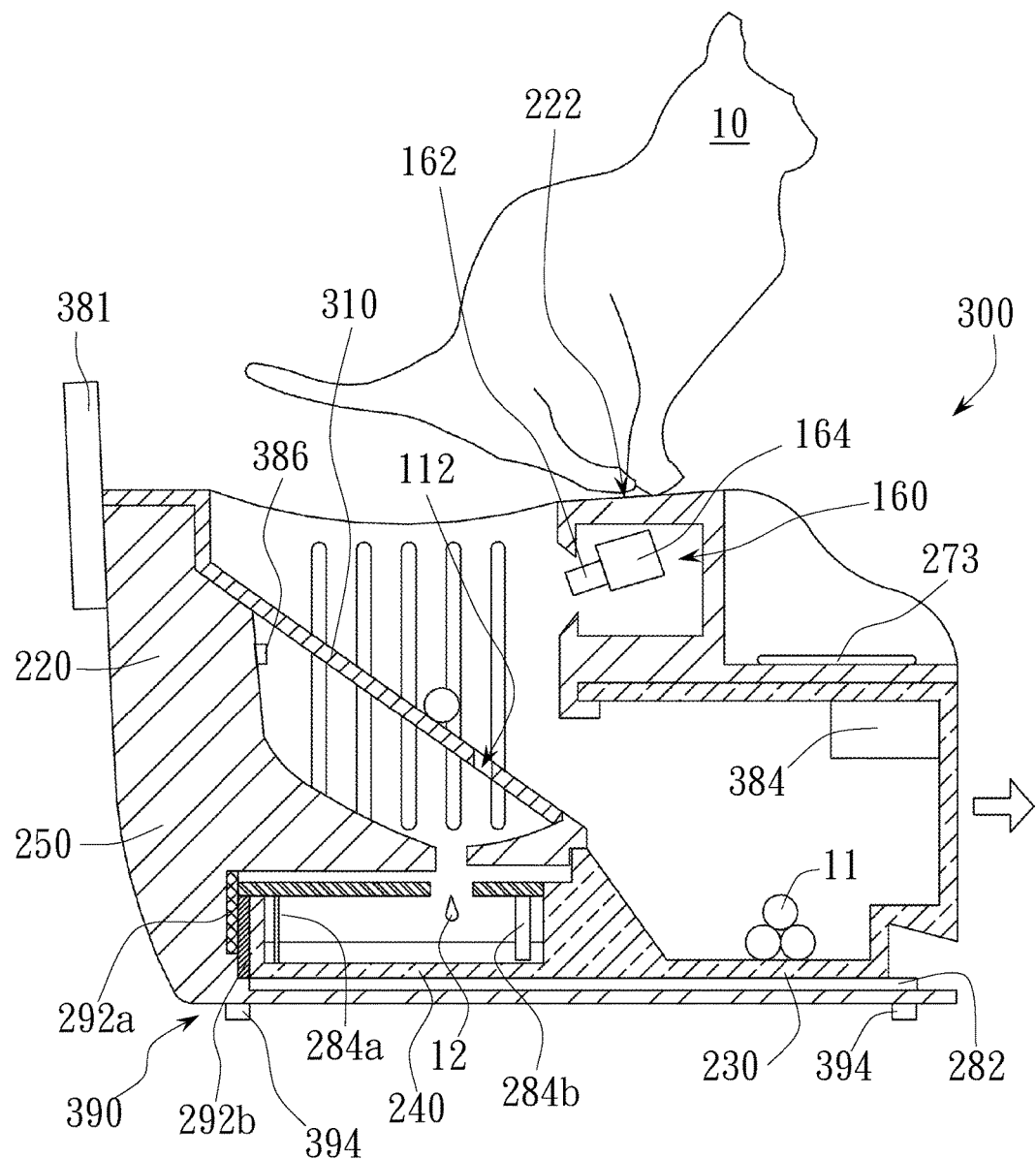
FIG. 3B is a cross-sectional schematic illustration of a cross-section along line 3B-3B as illustrated in FIG. 3A.

FIG. 3A is a three-dimensional schematic illustration of a toilet for cat according to another embodiment of the invention, and FIG. 3B is a cross-sectional schematic illustration of a cross-section along line 3B-3B as illustrated in FIG. 3A. Please refer to FIG. 3A and FIG. 3B, FIG. 3A and FIG. 3B, the toilet for cat 300 is similar to the toilet for cat 200. The toilet for cat 300 further includes the inclined classifying part 310, the supporting part 220, the feces storage container 230, the urine storage container 240, the case 250, the spray assembly 160, the controller unit 171, the control panel 272, the detector 381, the touch sensors 273, the weight sensor 282, the temperature sensor 284a, the liquid level sensor 284b, and the electric connecting parts 292a and 292b.

In addition, similar to the above-mentioned toilet for cat 200, the controller unit 171 is also electrically connected to the spray assembly 160, the control panel 272, the detector 381, the touch sensors 273, the weight sensor 282, the temperature sensor 284a and the liquid level sensor 284b (as shown in FIG. 2E), wherein the controller unit 171 is also electrically connected to the temperature sensor 284a and the liquid level sensor 284b through the electric connecting parts 292a and 292b.

The differences between the toilet for cat 300 and the toilet for cat 200 will be described below, while the same features of both will not be repeatedly disclosed. In addition, in order to simplify the contents, elements of the toilet for cat 100, 200 and 300 with similar structures and identical functions will be given the same labels.

Different from the above-mentioned toilet for cat 100 and 200, the toilet for cat 300 may further includes the level adjusting assembly 390, which is located in the bottom portion of the case 250. The level adjusting assembly 390 can adjust the level so that the toilet for cat 300 may be placed on a horizontal surface (horizontal level). In addition, in order to identify whether the toilet for cat 300 is on a horizontal surface, the toilet for cat 300 may further include a spirit level (not shown) located at the supporting part 220 or the case 250.

In the embodiment as illustrated in FIG. 3B, the level adjusting assembly 390 may include four level adjusting screws 394. However, in other embodiments, the level adjusting assembly 390 may includes only three level adjusting screws 394. These level adjusting screws 394 are all located at the bottom portion of the case 250, and support the case 250. By screwing operations, the lengths of the level adjusting screws 394 may be changed, and thus it is possible to adjust the level of the toilet for cat 300.

Additionally, the inclined classifying part 310 in this embodiment is different from the inclined classifying part 210 in the above-mentioned embodiment. In practically, the inclined classifying part 310 includes not only the through hole 112, but also multiple through holes 312 and multiple trenches 316. Although the inclined classifying part 310 shown in FIG. 3A includes two trenches 316, however, the inclined classifying part 310 may have one trench 316, or three or more trenches 316.

Figure 3C:
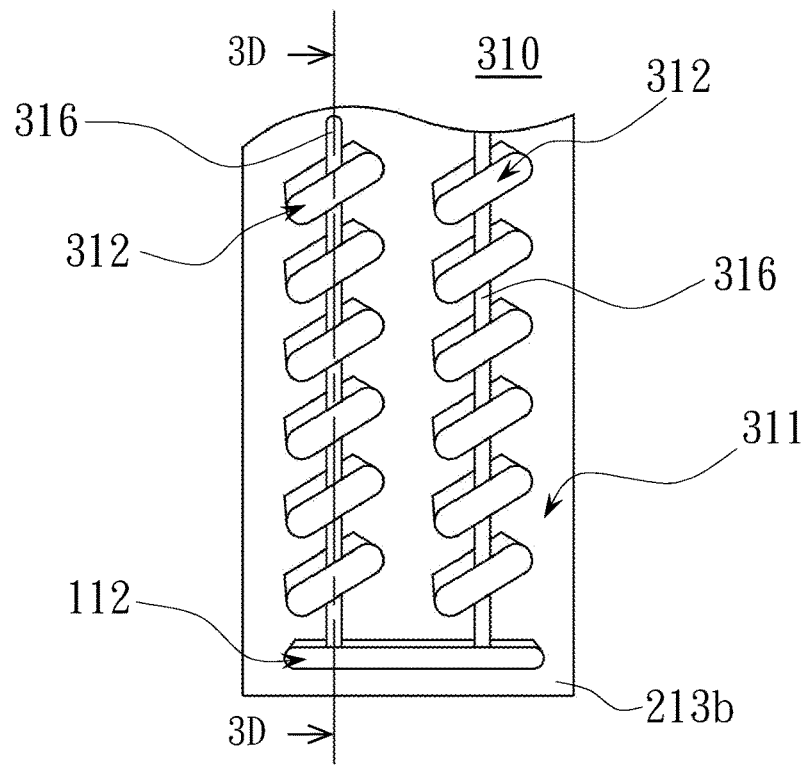
FIG. 3C is a schematic top view of a inclined classifying part as illustrated in FIG. 3A.
Figure 3D:
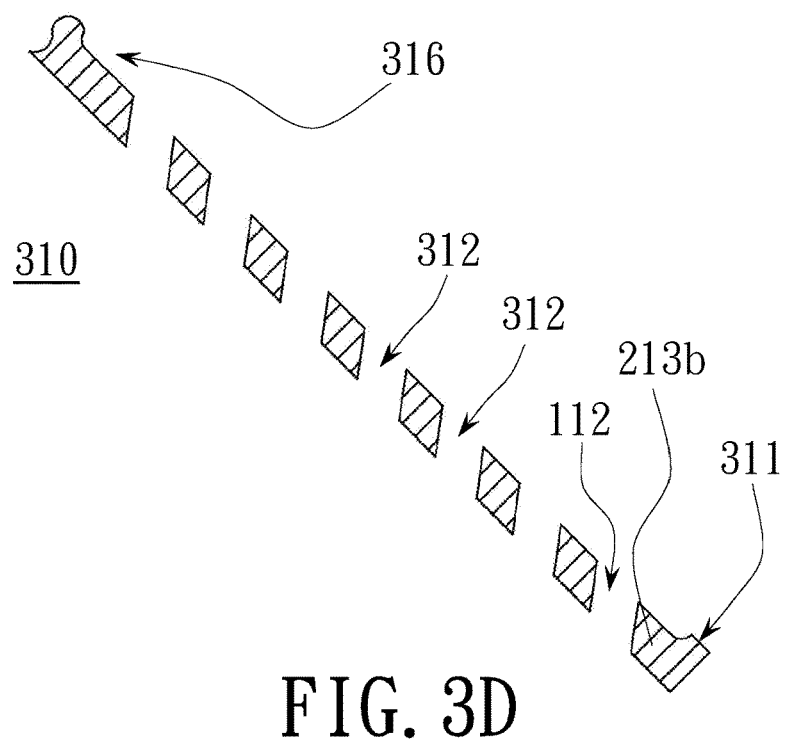
FIG. 3D is a cross-sectional schematic illustration of a cross-section along line 3D-3D as illustrated in FIG. 3C.

Please refer to FIG. 3A, FIG. 3C and FIG. 3D, the inclined classifying part 310 has a sloped surface 311, an upper end 213a and a lower end 213b opposite to the upper end 213a, and the through holes 312 and the trenches 316 are all formed on the sloped surface 311. The trenches 316 extend from the upper end 213a toward the lower end 213b. The at least one trench 316 may extend along a reference line (as the line 3D-3D shown in FIG. 3C), and the reference line passes through holes 312 and 112. In addition, the depth of one or multiple trenches 316 may less than the depth of the through holes 312 and 112, therefore the portions of the trenches 316 outside the through holes 312 and 112 would not penetrate through the inclined classifying part 310.

Please refer to FIG. 3C and FIG. 3D, the through holes 312 are arranged in arrays, and may extends in the same direction. However, the extension direction of the through holes 312 may be different from the extension direction of the through hole 112, as shown in FIG. 3C. However, in other embodiments, at least two through hole 312 may have different extension directions. Alternatively, the through holes 312 and the through hole 112 may have the same extension direction. In addition, the cross-sectional structures of the through holes 312 and the through hole 112 are the same, which have been described in the above-mentioned embodiments shown in FIG. 1C and FIG. 1D, and thus will not be repeatedly described here.

Please refer to FIG. 3A and FIG. 3B, in the toilet for cat 300, the detector 381 can detect whether the cat 10 is on the supporting surface 222 or not. When the detector 381 detects that the cat 10 on the supporting surface 222 leaves the toilet for cat 300 after defecation/urination, the controller unit 171 would start the pump 164 to allow the nozzle 162 to spray the cleaning liquid.

However, different from the above-mentioned detector 281, the detector 381 shown in FIG. 3A and FIG. 3B is an infrared sensor, e.g., an infrared image sensor. The infrared image sensor may identify whether the cat 10 is on the supporting surface 222 for defecation or urination by utilizing an image processing method, wherein the image processing method may include object recognition. Therefore, different from the pressure-sensitive detector 281, the detector 381 detects whether the cat 10 is on the supporting surface 222 by infrared. In addition, the detector 381 may also be applied in the toilet for cat 200, and the detector 381 may replace the detector 281 of the toilet for cat 200.

The toilet for cat 300 further includes a sensor 384 electrically connected to the controller unit 171, which is arranged within the feces storage container 230. The sensor 384 can identify whether the cat 10 on the supporting surface 222 had really excreted the feces 11, wherein the sensor 384 may be a vibration sensor or a sound sensor, and the sound sensor, e.g., is a sonic transducer. When the sensor 384 is a vibration sensor, while the detector 381 detects that the cat 10 leaves the supporting surface 222, and the sensor 384 detects that the feces storage container 230 vibrates, the controller unit 171 will start up the pump 164 to have the nozzle 162 spray cleaning liquid.

In the situation that the sensor 384 is a sound sensor, when the detector 381 detects that the cat 10 leaves the supporting surface 222, and the sensor 384 detects the sound generated when the feces 11 hit the feces storage container 230, the controller unit 171 will start the pump 164 to allow the nozzle 162 to spray the cleaning liquid. In addition, in this embodiment, the sensor 384 may be a vibration sensor or a sound sensor, i.e. the toilet for cat 300 includes a vibration sensor or a sound sensor. However, in other embodiments, the toilet for cat 300 may further includes a vibration sensor and a sound sensor. Therefore, the toilet for cat 300 is not limited to have only one of the vibration sensor and the sound sensor.

The toilet for cat 300 may further include an odor sensor 386 electrically connected to the controller unit 171, which is assembled in the supporting part 220. The odor sensor 386 can detect odor of both the feces storage container 230 and the urine storage container 240. When the odor sensor 386 detects odor of the feces storage container 230 and the urine storage container 240 exceeds a concentration threshold, the controller unit 171 would have the control panel 272 indicate the reminder message, and may start the pump 164 to allow the nozzle 162 to spray the cleaning liquid, wherein the above-mentioned reminder message is, e.g., a blinking screen of a touch screen or sound generated by a buzzer. However, in other embodiments, the controller unit 171 may only generate the reminder message, however, without starting up the pump 164. Alternatively, the controller unit 171 may only start up the pump 164, however, without generating the reminder message.

It is worthy to know that the level adjusting assembly 390 may also be arranged at the bottom portion of the case 150 of the toilet for cat 100, and the detector 384 may be arranged in the feces storage container 130 of the toilet for cat 100 or the feces storage container 230 of the toilet for cat 200. Therefore, the level adjusting assembly 390 and the detector 384 may also be applied to the above-mentioned toilet for cat 100 and 200, and is not limited to be only applied in the toilet for cat 300.

Figure 4:
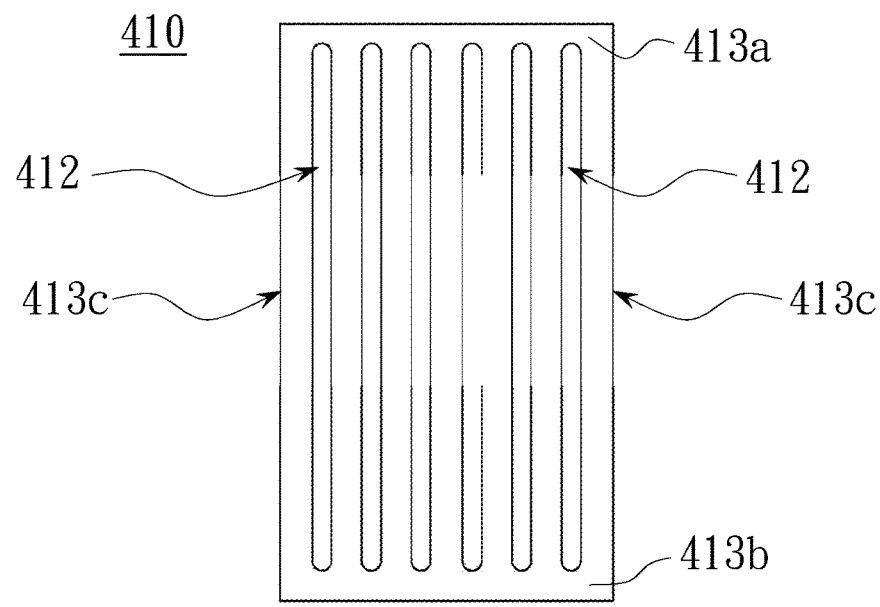
FIG. 4 is a schematic top view of an inclined classifying part according to another embodiment of the invention.
Figure 5:
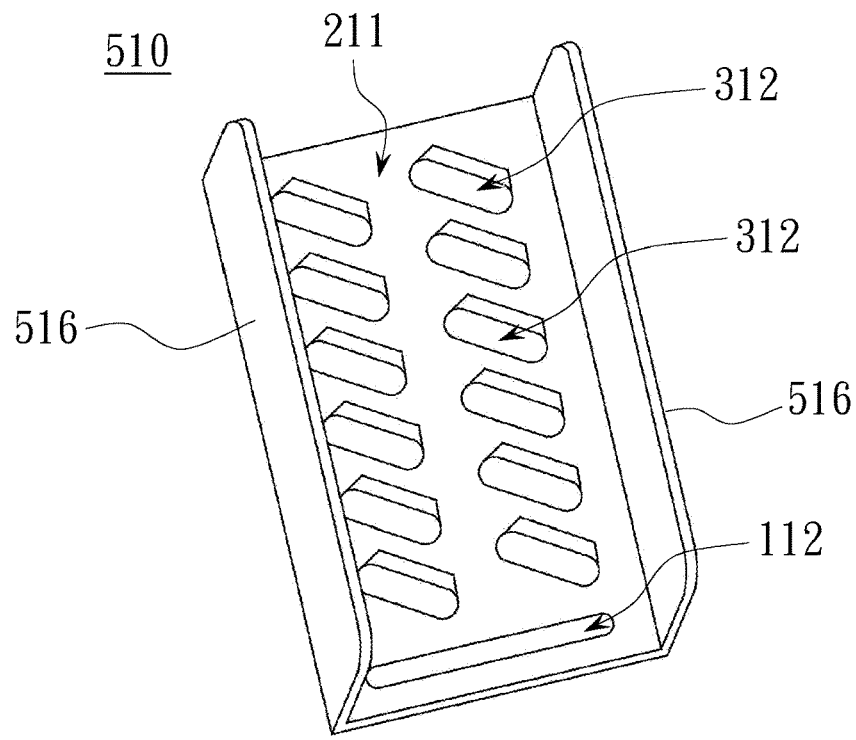
FIG. 5 is a three-dimensional schematic illustration of an inclined classifying part according to another embodiment of the invention.
Figure 6:
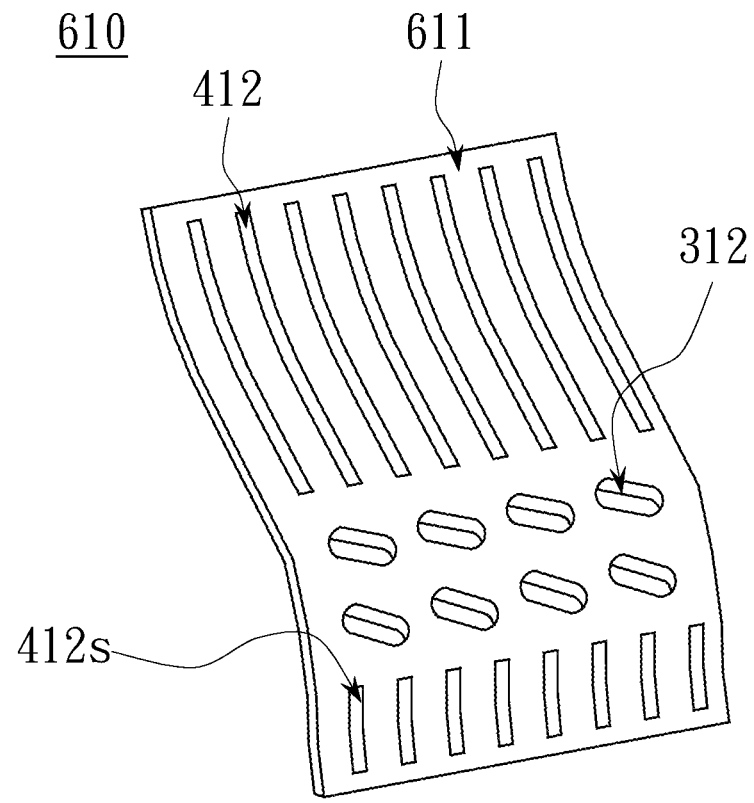
FIG. 6 is a three-dimensional schematic illustration of an inclined classifying part according to another embodiment of the invention.

Expect for the above-mentioned inclined classifying parts 110, 210 and 310, the above-mentioned toilet for cat 100, 200 and 300 may utilize other types of inclined classifying parts, as shown in FIG. 4 to FIG. 6. These inclined classifying parts will be described below by referring to FIG. 4 to FIG. 6. In addition, the functions of the inclined classifying parts shown in FIG. 4 to FIG. 6 are all the same with the inclined classifying parts 110, 210 and 310, and theses inclined classifying parts have structures similar to those of the inclined classifying parts 110, 210 and 310. Therefore, the descriptions below will focus on the differences between these inclined classifying parts and the aforementioned inclined classifying part, without repeatedly descriptions for the common features.

Please refer to FIG. 4, the inclined classifying part 410 has multiple through holes 412, the upper end 413a and the lower end 413b, and each of the through holes 412 is a strip. However, different from the extension directions of the aforementioned through holes 112 or 312, each of the through holes 412 extends from the upper end 413a to the lower end 413b, and these through holes 412 are parallel to one another, and may be substantially parallel to the tilted edge 413c of the inclined classifying part 410. In addition, in the embodiment as illustrated in FIG. 4, the inclined classifying part 410 has six through holes 412. However, in other embodiments, the number of the through holes 412 of the inclined classifying part 410 may be two or more than two.

Please refer to FIG. 5; the inclined classifying part 510 is similar to the inclined classifying part 310 shown in FIG. 3C. For example, the inclined classifying part 510 also includes through holes 312 and 112, and the arrangements and extension directions of the through holes 312 and 112 are identical to the inclined classifying part 310. However, different from the inclined classifying part 310, the inclined classifying part 510 further includes a pair of side plates 516, and the pair of side plates 516 are parallel and opposite to each other. The sloped surface 211 of the inclined classifying part 510 is placed between the pair of side plates 516, and both of the pair of side plates 516 extend from the sloped surface 211, wherein the side plates 516 and the sloped surface 211 are not coplanar. In addition, in the embodiment as illustrated in FIG. 5, the inclined classifying part 510 does not include the trench 316. However, in other embodiments, the inclined classifying part 510 may also include the trench 316, as shown in FIG. 3C.

Please refer to FIG. 6, the aforementioned inclined classifying parts 110, 210, 310, 410 and 510 are all flat plates, and the sloped surfaces 111, 211 and 311 are all flat surfaces. However, the inclined classifying part 610 shown in FIG. 6 has a shape like a wave board, and the sloped surface 611 is a curved surface (for example, a waved surface) instead of a flat plane. In addition, inclined classifying part 610 has through holes with several different shapes, e.g. the through holes 412, 312 and 412s, wherein these through holes 312 are placed between the through holes 412 and 412s. The through holes 412s extend in a direction the same with the extension direction of the through holes 412. However, the length of the through holes 412s is less than the length of the through holes 412.

It is noted that, although in the aforementioned embodiments, the inclined classifying parts 110, 210, 310 and 410 are all flat in shape, however, in other embodiments, the inclined classifying parts 110, 210, 310 and 410 may have shapes like a wave board. In addition, although the arrangements and shapes of the through holes of the inclined classifying parts have been indicated in the drawings, however, in other embodiments not shown in the drawings, the inclined classifying part may has through holes with arrangements and shapes different from those indicated in the drawings. Therefore, the arrangements and shapes of all through holes indicated in the drawings are only illustrative.

To sum up, the aforementioned toilets for cat may be suitable for defecation and urination of cats. Furthermore, the toilet for cat allows cats to defecate and urinate without the need of cat litters, so that the cost on cat litter is saved. In addition, the toilet for cat can separately store feces and urine to avoid mixing of feces and urine, and thus keep feces dry and avoid generation of maggots, so as to reduce the negative effects to the environment.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A toilet for a cat, for separating excreta into feces and urine, said toilet for cat comprising:
    a supporting part, having a supporting surface and an egestion opening formed on said supporting surface;
    a feces storage container, disposed below said supporting surface and having a first entrance;
    an inclined classifying part, having a sloped surface and at least one through hole formed on said sloped surface, wherein said sloped surface is exposed through said egestion opening for guiding said feces, so that said feces move from said sloped surface to said first entrance and enter said feces storage container from said first entrance; and
    a urine storage container, disposed below said sloped surface, for storing said urine flowed from said at least one through hole;
    wherein the supporting part comprises a guide concavity extending from said egestion opening, said guide concavity is disposed above said urine storage container, and said inclined classifying part further comprises a lower end disposed within said guide concavity, said guide concavity comprises:
        a bottom portion, having a concave surface;
        a drain outlet formed on said concave surface, wherein said urine storage container comprises a second entrance aligned to said drain outlet, and said drain outlet is disposed at a lowest portion of said concave surface relative to said second entrance;
        a pair of first sidewalls facing each other, extending from said egestion opening to said bottom portion, wherein said inclined classifying part is disposed between said pair of first sidewalls;
        a second sidewall, connected between said pair of first sidewalls and facing said sloped surface; and
        an opening, formed between said second sidewall and said bottom portion and connected to said first entrance, wherein said lower end is disposed at said opening.

2. The toilet for a cat according to claim 1, wherein said at least one through hole forms an enclosed pattern on said sloped surface.

3. The toilet for a cat according to claim 1, wherein said inclined classifying part further comprises an upper end opposite to said lower end, and a first distance between said at least one through hole and said upper end is larger than a second distance between said at least one through hole and said lower end, and a ratio of said first distance and said second distance is larger than or equal to 2.

4. The toilet for a cat according to claim 1, wherein said inclined classifying part further comprises at least one trench and an upper end opposite to said lower end, said at least one trench is formed in said sloped surface and extends in a direction from said upper end to said lower end, and a depth of said at least one trench is less than a depth of said at least one through hole, and said at least one trench extends along a reference line passing through said at least one through hole.

5. The toilet for a cat according to claim 1, wherein said at least one through hole has a first beveled edge and a second beveled edge opposite to said first beveled edge, and said inclined classifying part further comprises:
    a bottom surface opposite to said sloped surface, wherein a height of said first beveled edge relative to said lower end is larger than a height of said second beveled edge relative to said lower end;
    a first angle, formed between said sloped surface and said first beveled edge; and
    a second angle, formed between said sloped surface and said second beveled edge, wherein said first angle is larger than said second angle.

6. The toilet for a cat according to claim 1, further comprising a spray assembly, said spray assembly comprising:
    a nozzle, disposed below said supporting surface and exposed on said second sidewall, wherein said nozzle is inclined toward said bottom portion and is aligned to said sloped surface, and said nozzle does not protrude over said second sidewall; and
    a pump, connected to said nozzle, for transporting a cleaning liquid to said nozzle.

7. The toilet for a cat according to claim 6, further comprising:
    a controller unit, electrically connected to said pump for controlling said nozzle to spray said cleaning liquid;
    a case, wherein said supporting part is fixed on said case, and both of said feces storage container and said urine storage container are disposed within said case;
    a control panel, electrically connected to said controller unit and exposed on an outside surface of said toilet for cat; and
    a detector, electrically connected to said controller unit, wherein when said detector detects that the cat has left said toilet after defecating or urinating on said supporting surface, said controller unit starts said pump for allowing said nozzle to spray said cleaning liquid.

8. The toilet for a cat according to claim 7, wherein said detector is a pressure sensor, and said pressure sensor is disposed on said supporting surface.

9. The toilet for a cat according to claim 7, further comprising a touch sensor, wherein said touch sensor is disposed on an outside surface of said toilet, and when said touch sensor detects that said outside surface is touched, said controller unit stops an operation of said pump.

10. The toilet for a cat according to claim 7, further comprising at least one weight sensor electrically connected to said controller unit, wherein said at least one weight sensor is disposed on at least one of a bottom of said feces storage container and a bottom of said urine storage container, and when said detector detects that said cat has left said supporting surface, and said at least one weight sensor detects that a weight of said feces storage container or said urine storage container increases, said controller unit starts said pump for allowing said nozzle to spray said cleaning liquid.

11. The toilet for a cat according to claim 7, further comprising a temperature sensor electrically connected to said controller unit, wherein said temperature sensor is disposed within said urine storage container, when said detector detects that said cat has left from said supporting surface, and said temperature sensor detects that a temperature of said urine storage container increases, said controller unit starts said pump for allowing said nozzle to spray said cleaning liquid.

12. The toilet for a cat according to claim 7, further comprising an odor sensor electrically connected to said controller unit, wherein said odor sensor is installed within said case for detecting an odor of said feces storage container and said urine storage container, when said odor sensor detects that said odor of said feces storage container and said urine storage container exceeds a concentration threshold, said controller unit starts said pump for allowing said nozzle to spray said cleaning liquid.

13. The toilet for a cat according to claim 7, further comprising a liquid level sensor electrically connected to said controller, wherein said liquid level sensor is disposed within said urine storage container, when said liquid level sensor detects that a liquid level of said urine in said urine storage container exceeds a standard level, said controller unit enables said control panel to generate a reminder message.

14. The toilet for a cat according to claim 1, wherein said inclined classifying part further comprises an upper end opposite to said lower end, and said supporting part further comprises:
 a bump disposed within said guide concavity and protruding over said concave surface, wherein said bump comprises an inclined guiding surface, and said inclined guiding surface is aligned with said sloped surface;
 a holding protrusion, disposed within said guide concavity and protruding over a sidewall of said guide concavity, wherein said holding protrusion is disposed opposite to said bump, a level of a top of the bump relative to the urine storage container is lower than a level of a top of the holding protrusion relative to the urine storage container, said upper side is disposed on a top of said holding protrusion, and said lower end abuts against said bump; and
 an extension portion, disposed around said opening, for fitting said first entrance, so that said extension portion extends into said first entrance, wherein the fitting between said extension portion and said first entrance are transition fit or clearance fit.

15. The toilet for a cat according to claim 1, further comprising:
 a case, wherein said supporting part is fixed on said case, and both of said feces storage container and said urine storage container are disposed within said case, said feces storage container and said urine storage container are connected to each other to be integrated as a drawer installed within said case; and
 a level adjusting assembly, disposed on a bottom of said case.

16. The toilet for a cat according to claim 1, wherein said supporting part further comprises a fence, said fence is disposed around said supporting surface, and said supporting surface is a concave surface or a plane.

17. The toilet for a cat according to claim 1, wherein said inclined classifying part further comprises an upper end opposite to said lower end, said supporting surface is ring shaped, and said supporting surface comprises:
 a pair of lateral side areas;
 a first area, connected between said pair of lateral side areas; and
 a second area, disposed opposite to said first area, wherein said pair of lateral side areas, said first area and said second area surround said egestion opening, said upper end is disposed between said first area and said lower end, and said lower end is disposed between said second area and said upper end, and an area of said first area is smaller than an area of said second area.

18. The toilet for a cat according to claim 1, wherein said inclined classifying part is a waved plate, and said sloped surface is a curved surface.

19. The toilet for a cat according to claim 1, wherein said inclined classifying part further comprises a pair of side plates, and said pair of side plates are parallel and opposite to each other, said sloped surface is disposed between said pair of side plates, both of said pair of side plates extend from the sloped surface, wherein said pair of side plates and said sloped surface are non-coplanar.

* * * * *